United States Patent [19]

Moslehi et al.

[11] Patent Number: 4,768,850

[45] Date of Patent: Sep. 6, 1988

[54] CASCADED FIBER OPTIC LATTICE FILTER

[75] Inventors: Behzad M. R. Moslehi; Herbert J. Shaw, Stanford, both of Calif.

[73] Assignee: The Board of Trustees of the Leland Stanford Junior University, Stanford, Calif.

[21] Appl. No.: 622,637

[22] Filed: Jun. 20, 1984

[51] Int. Cl.$^4$ .............................................. G02B 6/26
[52] U.S. Cl. ................................ 350/96.15; 350/96.16
[58] Field of Search ........................ 350/96.15, 96.16; 250/227

[56] References Cited

U.S. PATENT DOCUMENTS

| | | | |
|---|---|---|---|
| 4,159,418 | 6/1979 | Marom | 350/96.15 |
| 4,432,599 | 2/1984 | McMahon | 350/96.15 |
| 4,671,605 | 6/1987 | Soref | 350/96.15 |
| 4,676,585 | 6/1987 | Shaw et al. | 350/96.15 |

OTHER PUBLICATIONS

Caulfield, et al., "Optical Implementation of Systolic Array Processing", *Optics Communications*, vol. 40, No. 2, pp. 86–90, 12/15/81.
Casasent, "Acoustooptic Transducers in Iterative Optical Vector-Matrix Processors", *Applied Optics*, vol. 21, No. 10, 05/15/82.
Taylor, "Fiber and Integrated Optical Devices for Signal Processing", SPIE, vol. 176, *Guided Wave Optical Systems and Devices*, II (1979), pp. 17–27.
Burgh, et al., "Single Mode Fiber Optic Directional Coupler", *Electronics Letters*, vol. 16, No. 7, 03/27/80.
Mitra, et al., "Digital Ladder Networks", *IEEE Trans. Audio Electroacoust.*, vol. AU-21, 30–36, Feb. 1973.
Newton, et al., "Single Mode Fiber Recirculating Delay Line", SPIE Conference, Jan. 1982.
Bowers, et al., "Filter Response of Single-Mode Fiber Recirculating Delay Lines", *Electronics Letters*, vol. 18, No. 3, 02/04/82.
Tur, et al., "Fiber—Optics Signal Processors with Applications to Matrix-Vector Multiplication and Lattice Filtering", *Optics Letters*, vol. 7, No. 9, Sep., 1982, pp. 463–465.
E. Marom, "Optical Delay Line Matched Filters", *IEEE Trans. Circuits Syst.*, CAS-25, pp. 360–364 (1978).
Markel, et al., *Linear Prediction of Speech*, (Springer-Verlag, New York, 1976), pp. 18, 31, 32 and 131.
"Directional Couplers Send TV Signals Down a Single Optical-Fiber Cable", *Electronics*, vol. 51, No. 19, 09/14/78, p. 70.
Fujii, et al., "Low-Loss 4×4 Optical Matrix Switch for Fibre-Optic Communication", *Optical Letters*, May 31, 1979.
Lefevre, "Single-Mode Fibre Fractional Wave Devices and Polarisation Controllers", *Electronics Letters*, vol. 16, No. 20, 09/25/80, pp. 778–780.
Marom, et al., "Encoding-Decoding Optical Fibre Network", *Electronics Letters*, vol. 14, No. 3, 02/02/78.

*Primary Examiner*—John Lee
*Assistant Examiner*—Frank González
*Attorney, Agent, or Firm*—Knobbe, Martens Olson & Bear

[57] ABSTRACT

A fibre optic lattice filter having a transfer function wherein the poles and zeros are adjustable independently of each other. The filter comprises a cascaded configuration of recursive and non-recursive fiber optic lattice filters. In one preferred embodiment, an all-pass fiber optic filter is formed by cascading all-pole and all-zero lattice filters, and by processing the resulting filtered output signal in a subtractive detection system. This detection system produces a signal which represents the difference between two signal outputs provided by the all-zero filter section, and which is adjustable in magnitude, thereby providing an overall filtering function which is capable of handling both positive and negative valued input signals.

27 Claims, 9 Drawing Sheets

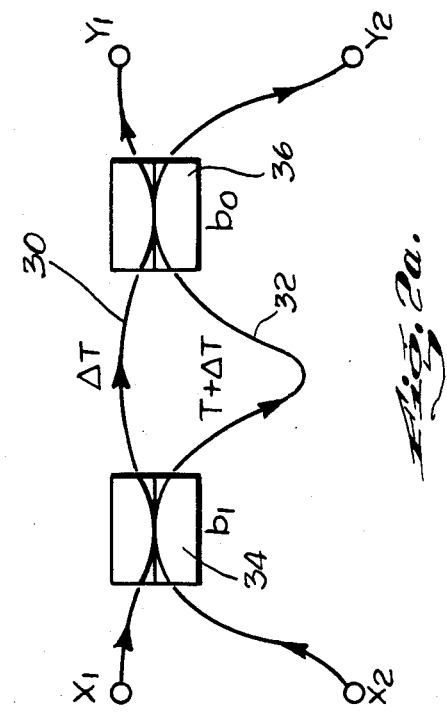
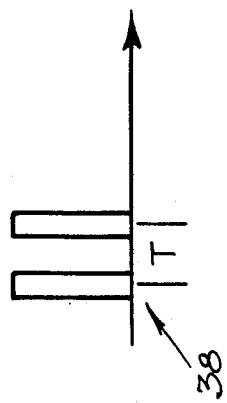
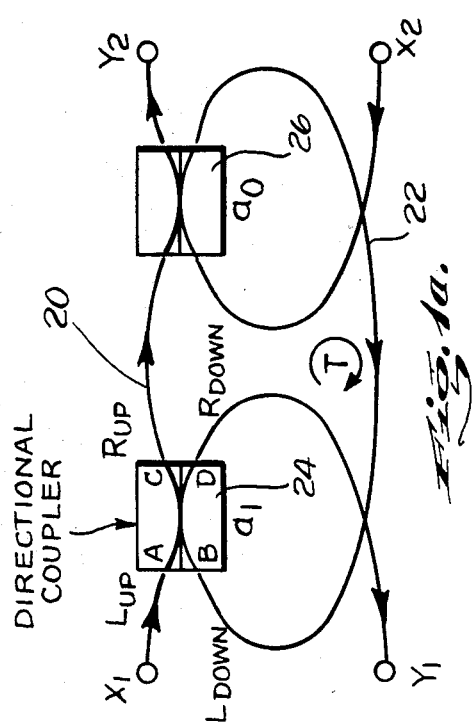
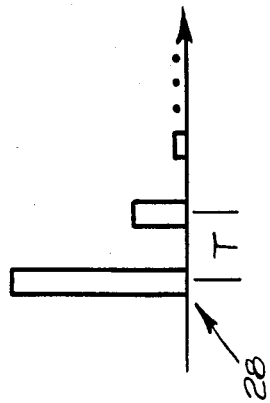

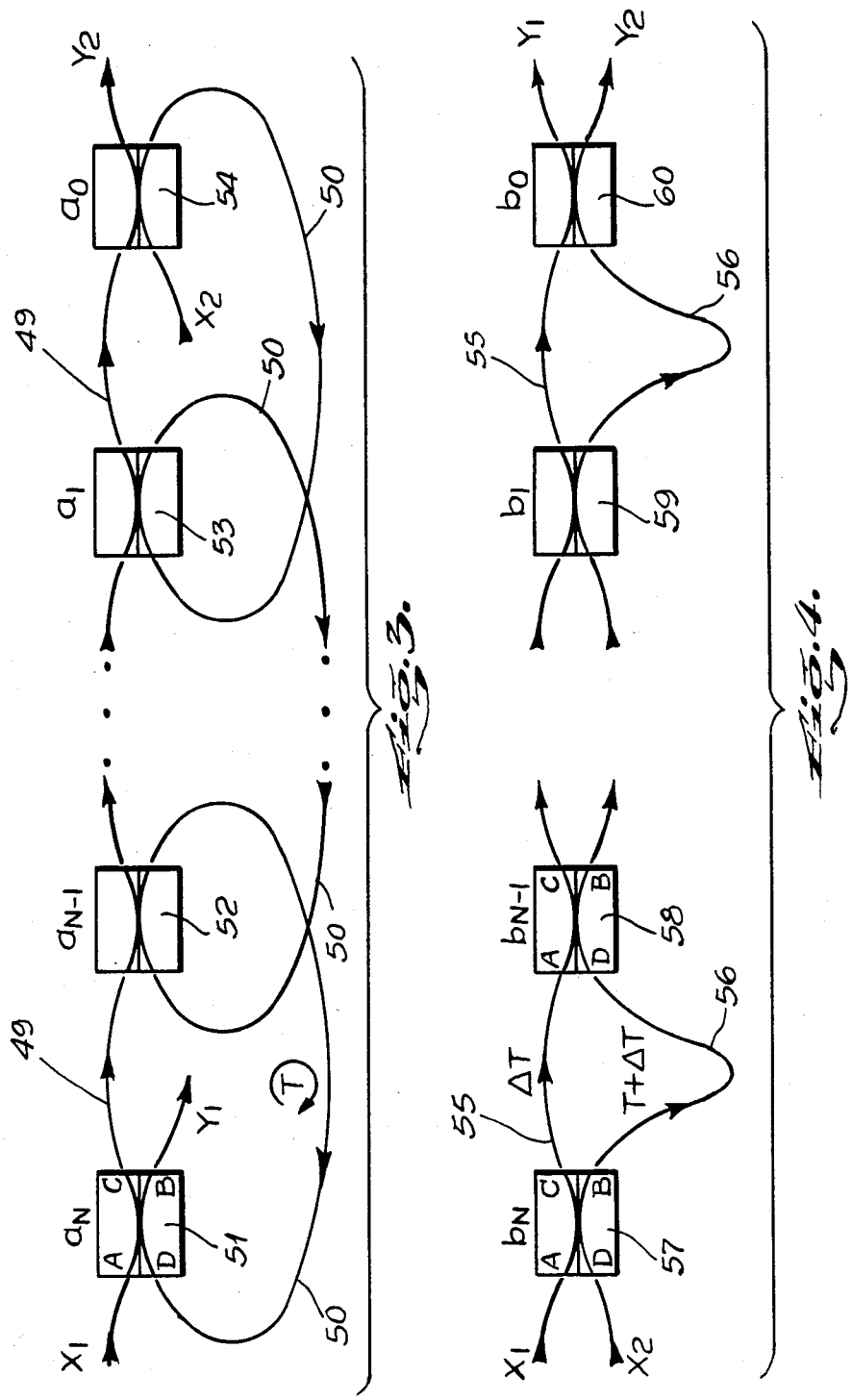

(b)

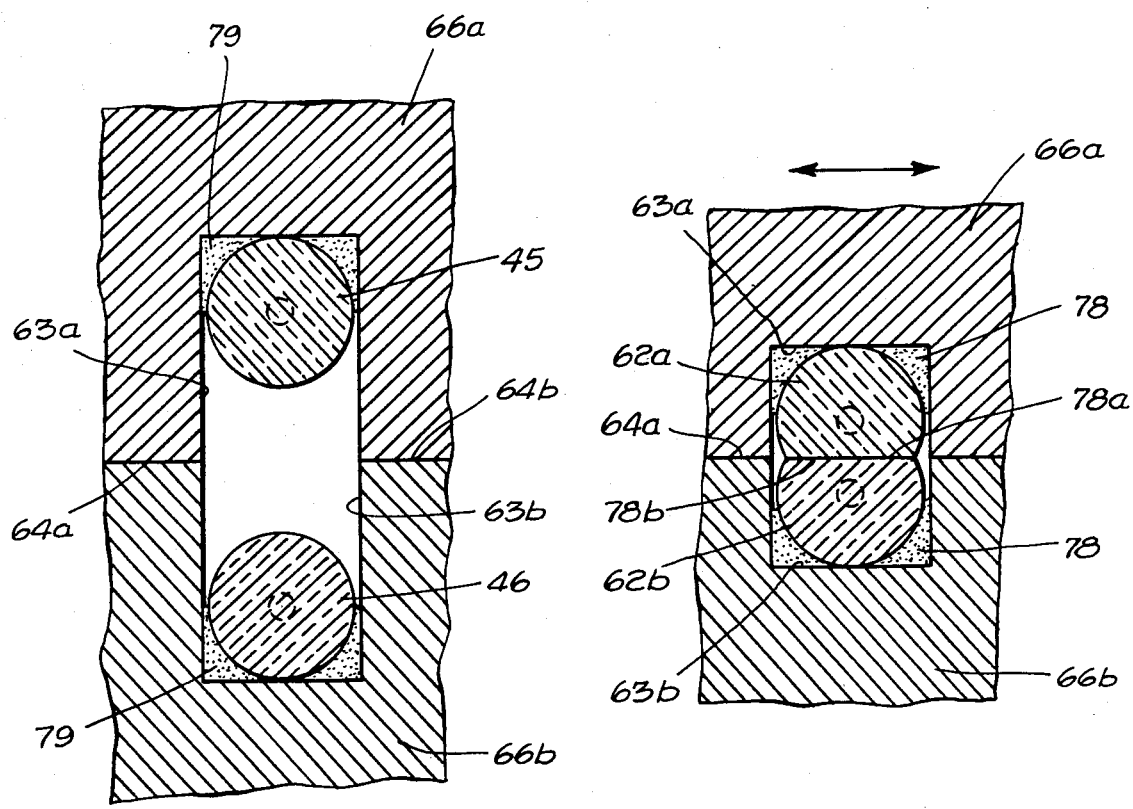
Fig. 6.
Fig. 7.
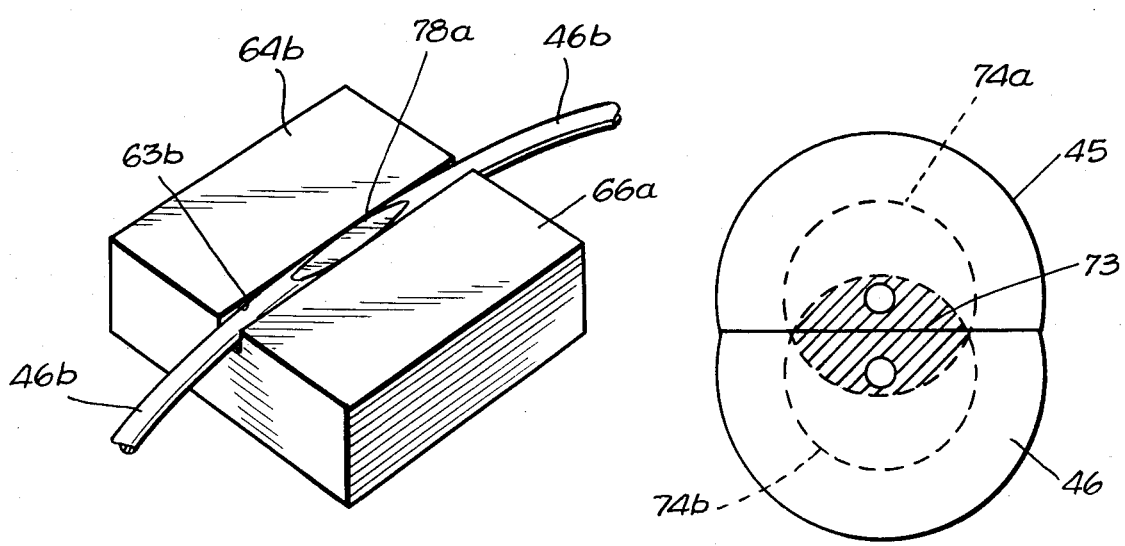
Fig. 8.
Fig. 9.

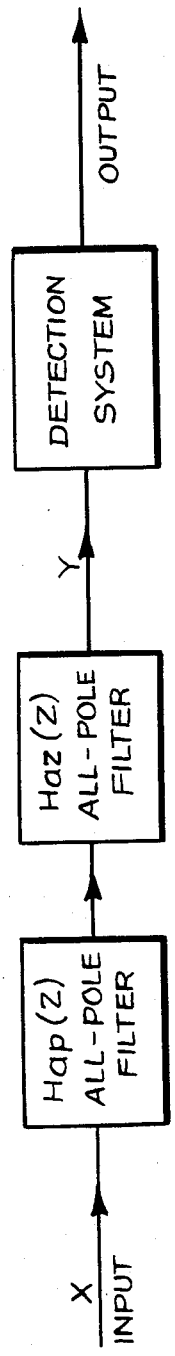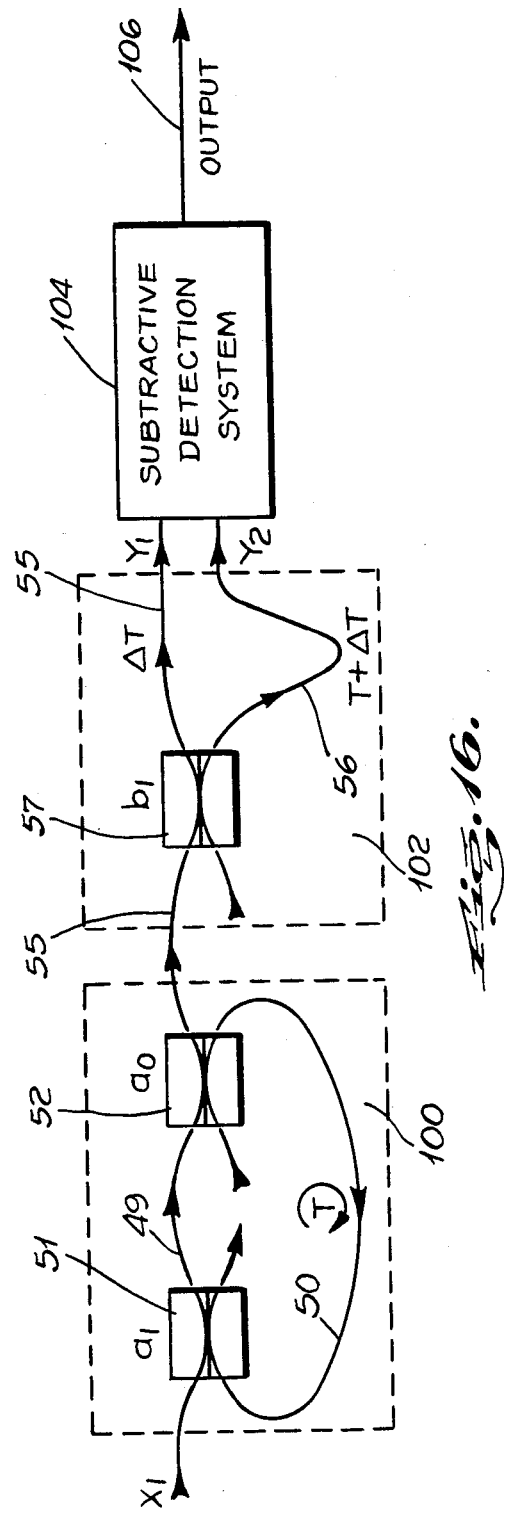

CASCADED FIBER OPTIC LATTICE FILTER

BACKGROUND OF THE INVENTION

The invention relates generally to the field of optical guided wave signal processors and, more particularly, to fiber optic devices for filtering signals.

The need for more and more data processing speed grows with increasingly complex applications. For example, in computer systems that process images from TV cameras for robotic vision, a vast amount of information is generated which must be processed. This vast quantity of information can overwhelm an ordinary computer, leading to unacceptable processing times.

One way of speeding up such signal processing is through pipeline architecture for computers. Pipelining is a hardware configuration, i.e., architecture for a computer, involving a plurality of processors linked into an array to achieve higher performance. This is done by breaking up complex, time-consuming functions into a series of simpler, shorter operations, each of which can be executed in assembly line fashion with simultaneous computation on different sets of data by the different processors. The improvement in performance is directly proportional to the number of pipeline processors in the array that are simultaneously kept busy doing part of the task. Pipelining is most effective in special purpose applications which can use array processors.

A further increase in the speed of such processing may be achieved by use of fiber optic systems in the pipeline architectures, as well as in other signal processing portions of a given system. Optical devices may be utilized to achieve such increases in data processing speed because of their excellent propagation and delay properties. The low loss and low dispersion of single-mode fiber allow signals to propagate large distances without significant attenuation or distortion.

The propagation and delay properties of single-mode fiber are particularly attractive because digital signal processing and conventional analog signal processing techniques (such as those using surface acoustic wave devices) are limited in their usefulness in applications involving signal bandwidths exceeding one or 2 gigahertz, although they are very effective at lower frequencies. Those digital and conventional analog signal processing techniques simply cannot be used in applications requiring very high data rates where it is often the case that bandwidths of 10 GHz and beyond may be needed.

The real-time processing of broad band radar signals is an example of a current application which would benefit from optical fiber devices capable of handling high frequency bandwidths. Other potential applications include the direct interfacing of fiber processors with high-speed optical communications systems. Likewise, fiber systems can perform real-time processing operations on the optical output of one or more fiber sensors, including the time-division multiplexing of slow sensor outputs to match the high data rates that can be handled by fiber systems. In either case, the ability to process broadband optical data before transduction into electrical signals can be of great practical value, and finds application in a wide variety of circumstances.

The concept of systolic arrays for computing data as signals pass through system has been proposed in the prior art for network processing. Various optical array processors which have been proposed for such purposes are described in the prior art. Among them are processors described by Caulfield et al., "Optical Implementation of Systolic Array Processors", *Optics Communications,* Vol. 40, No. 2, pages 86–90, Dec. 15, 1981; Casasent, "Acoustooptic Transducers in Iterative Optical Vector-Matrix Processors", *Applied Optics,* Vol. 21, No. 10, May 15, 1982; Taylor, "Fiber and Integrated Optical Devices for Signal Processing", SPIE Vol. 176, *Guided Wave Optical Systems and Devices,* II (1979), pages 17–27.

A common problem in these systems theory and signal processing areas is that of signal filtering. Depending upon the particular application, filtering may be used for purposes such as restoring a distorted signal, or extracting one signal from a combination of signals and/or noise. Viewed most simply, a filter functions to remove undesired components from an input signal, so that only the desired signal components are allowed to pass through the filter. In most signal processing areas, it is very desirable to have filters having the capability of providing a broad range of complex frequency responses, so that the filter may be utilized in any of numerous applications.

There are several different optical devices which have been utilized for filtering signals. For example, one device comprises a transversal filter, such as a tapped-delay line, whose tap weights are adjusted to realize the desired filtering option. This transversal filter is sometimes called a non-recursive system or a finite-duration impulse response (FIR) filter. In FIR filters, impulse signals applied to their inputs eventually pass entirely through the filter. These non-recursive filters introduce only zeros into the system transfer function, and are therefore also known as "all-zero filters." The principal disadvantage of FIR filters, whether of tapped-delay line or lattice type, is that obtaining sharp filtering requires many stages of individual taps or of directional couplers. This need for many stages makes sharp FIR lattice filters difficult to fabricate and relatively expensive. In addition, an analysis of this particular type of all-zero filter using the Z-transform technique establishes that using positive valued input signals it is impossible to obtain zeros in the transfer function of this filter in a wedge-shaped region of the Z-transform plane which is symmetric about the positive Z-axis, having its vertex at that plane's origin. In addition, this analysis also demonstrates that all the zeros of the transfer function may be restricted to the right-hand side of the Z-transform plane only if negative valued signals are allowed to be filtered through the system.

One type of filter of the FIR type is described in U.S. Pat. No. 4,159,418 to Marom. This patent discloses a matched filter coding device comprising a fiber optic structure involving two fiber optic waveguides carrying light in the same direction and cross coupled by a plurality of directional couplers. The fiber optic waveguides are multimode. This structure was said to have matched filter properties. The Marom structure differs from the structure of the present invention for reasons such as the direction of light propagation in the output fiber which results in no feedback recirculation between couplers in the Marom device. Marom also uses multimode fiber.

In addition to the FIR filters, there is another class of filters whose impulse response has infinite duration in time. These filters are called infinite-duration impulse response (IIR) or recursive filters. Recursive filters introduce, in general, both poles and zeros (pole-zero filter) in the transfer function. In a special case, recursive filters can introduce only poles into the transfer function, in which case the name "all-pole filter" is used. In the IIR filter, one input signal propagates along a feed-forward line to a successive coupler while another signal propagates along the feed-backward line to the prior coupler on the feed-forward line. Thus, a portion of the signal transmitted from the output of a directional coupler on the feed-forward line will return from the immediately successive coupler via the feed-backward line after an overall loop delay time interval T.

Like the FIR filter, a particular filtering function may be obtained from an IIR fiber optic lattice filter by selecting the amount of light signal coupled between the fibers and by selecting the loop transit times T associated with each of the filters' stages.

IIR fiber optic lattic filters exhibit the advantages of that general class of non-fiber optic filters, such as being capable of extremely sharp frequency response with a small number of stages. The disadvantages of this filter are the complexity of its design, concern over filter stability, and the filter's intrinsically non-linear phase response. Furthermore, analysis of the transfer function for an IIR fiber optic lattice filter establishes that the filter may include both poles and zeros whose respective locations on the Z-transform plane are interdependent. That is, if particular inputs and outputs are used on this type of filter, the filter's poles and zeros cannot be adjusted independently of each other. Alternatively, when the inputs and outputs of the filter are chosen so as to define an all-pole transfer function, with zeros located either at the origin or at infinity, then the poles of the filter may be adjusted independently of its zeros because of the location of its zeros. Such analysis also demonstrates that because such a fiber optic lattice filter is a positive system, in that light intensities are used as signals, its poles are restricted to the particular regions of the Z-transform plane determined by the number of stages in the filter.

Still another filter arrangement is the lattice filter, which is merely a fiber filter structure and which is implemented by cascading together a multiplicity of the fiber filter structures such as those which are individually described herein. Lattice structures are suitable forms for performing signal processing operations, and they have some advantageous characteristics as compared to other filter forms, such as modularity, regularity, ease of implementation and good sensitivity. Lattice structures are particularly desirable since, by varying the coupling coefficients of the lattice couplers, one can adjust the system transfer function and, therefore, shape the frequency response of the filter.

Fiber optic filters such as those described above suffer from a limitation which is not shared by other, corresponding classes of non-optic filters. Specifically, fiber optic lattice filters comprise positive systems since they employ light intensity as the signal carrying medium. With this signal medium, negative weighting of taps cannot be accomplished. Further, because the filters employ directional couplers which can only additively, rather than subtractively, transfer light signals between fibers, only positive valued signals may be applied to and processed within the filter. The absence of negativity in these fiber optic lattice filters limits the regions of the Z-transform plane in which poles and zeros of the respective filter classes may be located.

In light of the above, it becomes apparent that what is needed in the art is a fiber optic filter arrangement wherein the location of the filter's poles and zeros in the Z-transform plane may be established independently, thus increasing the range and complexity of response of a given filter. It would be a further improvement to provide such a filter arrangement which provides an overall filtering function that is unrestricted by an absence of negativity.

SUMMARY OF THE INVENTION

The invention comprises a programmable fiber optic lattice filter with a transfer function having poles and zeros which may be adjusted independently of each other. The filter is formed by cascading recursive and non-recursive fiber optic lattice filters. In one preferred embodiment, an all-pass filter is formed by cascading all-pole and all-zero lattice filters, and by utilizing a subtractive detection system which allows negativity.

The invention is comprised of two monomode optical waveguides which are cross coupled by a plurality of fiber optic directional couplers located at various positions along the fiber. The two fibers carry light signals through the array. Each coupler has four ports, each fiber passing through two of those ports. The couplers can be tuned to vary the coupling and transmission operators which describe the coupler in terms of the amount of power on each fiber coupled to the other fiber and the amount of power remaining in the original fiber.

A coupler can be described by the operators $\tau$, r, t, $\rho$. These operators are defined in terms of the amount of light transmitted through the coupler on each fiber, and the amount of light cross coupled from each fiber to the other. The fibers between the couplers can be helically wound to implement varying delay between the couplers. The direction of the windings are varied so that forward coupling is provided in at least one non-recursive section of the lattice filter and backward coupling is provided in at least on other recursive section of the filter.

Thus, a cascaded filter is formed having poles and zeros which are independently adjustable in order to provide more complex frequency response by the lattice filter. The special all-pass filter configuration is formed by cascading a first order recursive section with a first-order non-recursive section, and applying the two outputs from the non-recursive section to two photodiodes of opposite polarity, adjusting the magnitudes of the respective output currents from the photodiodes with attenuators and by summing the adjusted output currents.

These and other objects and features of the present invention will become more fully apparent from the following description and depended claims taken in conjunction with the accompanying drawings.

BRIEF DESCRIPTION OF THE DRAWINGS

FIG. 1(a) is a schematic diagram illustrating a two-coupler recirculating (feed-backward) fiber optic delay line.

FIG. 1(b) is a plot of the response of the system of FIG. 1(a) to application of a light impulse signal.

FIG. 2(a) is a schematic diagram illustrating a two-coupler non-recirculating (feed-forward) fiber optic delay line.

FIG. 2(b) is a plot of the response of the system of FIG. 2(a) to application of a light impulse signal.

FIG. 3 is a schematic diagram illustrating an N-th order fiber optic lattice structure of the feed-backward configuration with N+1 couplers and N delay elements.

FIG. 4 is a schematic diagram illustrating an N-th order fiber optic lattice structure of the feed-forward configuration with N+1 couplers and N delay elements.

FIG. 6 shows a cross section of the coupler of FIG. 5, taken along the section line 6—6 in FIG. 5.

FIG. 7 shows a cross section of the coupler of FIG. 5 taken along the section line 7—7 in FIG. 5.

FIG. 8 shows a perspective view of one plate of the coupler of FIG. 5 showing the manner in which part of the fiber cladding is lapped away.

FIG. 9 illustrates the critical zone of coupling in the optical couplers used in the present invention.

FIG. 15 is a block diagram illustrating one preferred embodiment of the cascaded fiber optic lattice filter of the present invention, including recursive and non-recursive filter sections.

FIG. 16 is a schematic diagram of the cascaded, first-order all-pass fiber optic filter of the present invention.

DETAILED DESCRIPTION OF THE PREFERRED EMBODIMENT

Figure 5:
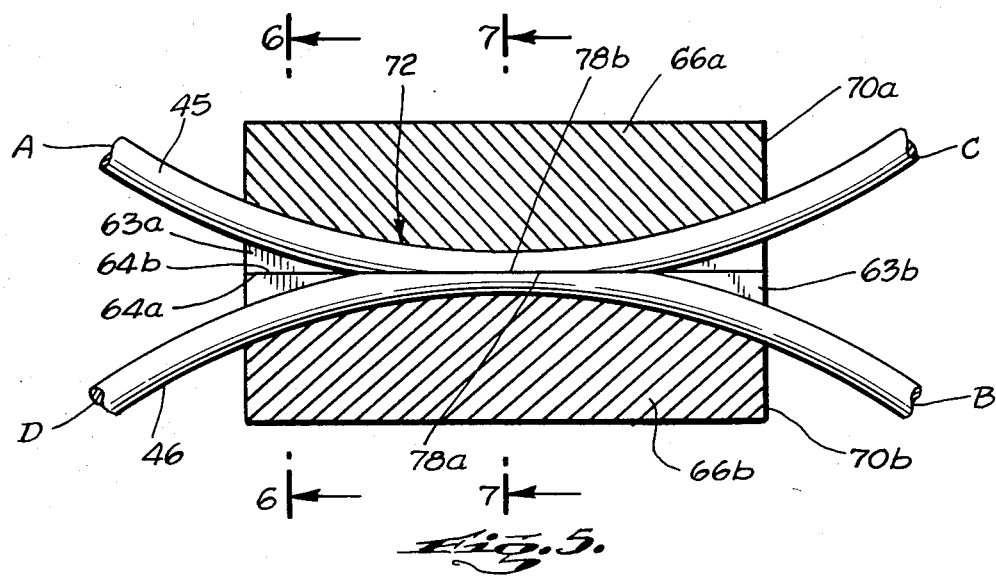
FIG. 5 shows a side cutaway view of one preferred embodiment of and optical coupler which may be used in the present invention.

The invention is best understood by reference to the figures wherein like parts are designated with like numerals throughout.

FIG. 1(a) illustrates the structure of a 2-coupler recirculating delay line. This delay line comprises first and second single-mode fiber optic waveguides 20 and 22, and several couplers 24 and 26 which are distributed along the lengths of the fibers. Specifically, fiber 22 is closed upon itself by the directional couplers 24 and 26 while fiber 20 extends directly between couplers 24 and 26. Thus, coupler 26 functions to feed some portion of the light from fiber 20 back to coupler 24 through fiber 22. Thus, optical signals applied to input $X_1$ of fiber 20 circulate repeatedly around the loop between the couplers 24 and 26, sending a portion of the recirculating intensity to the output $Y_2$ of fiber 20, as well as the output $Y_1$ of fiber 22. Referring to FIG. 1(b), it is seen that if a light impulse is applied at input $X_1$ of the device of FIG. 1(a), the system responds by producing a series of slowly decaying pulses equally spaced in time by a loop time delay difference T, indicated generally at 28.

FIG. 2(a) illustrates a non-recirculating (feed-forward) delay line comprising first and second single mode fiber optic waveguides 30 and 32 which are connected in a parallel configuration between two optical couplers 34 and 36. In this configuration, the outputs from coupler 34 on fibers 30 and 32 are fed forward to coupler 36 where they are recombined after a time delay T which is the time delay difference present between the portion of the two feed-forward fiber lines 30 and 32 which lies between couplers 34 and 36. Referring to FIG. 2(b), it is seen that the impulse response of this feed-forward configuration comprises just two pulses spaced by the amount of time delay T, as is indicated generally at 38.

The length of the optical fibers between the couplers 24 and 26 of FIG. 1 or 34 and 36 of FIG. 2 and the number of couplers in the filter depends upon the particular application for which the structure is intended. The directional couplers 24, 26, 34 and 36 may be as described by Bergh, Kotler and Shaw, in "Single Mode Fiber Optic Directional Coupler," *Electronic Letters, Vol.* 16, No. 7, Mar. 27, 1980, and U.S. Pat. No. 4,493,528, entitled "Fiber Optic Directional Coupler", the details of which are hereby incorporated by reference. Such couplers are adjustable such that the amount of light energy coupled between the fibers can be varied from 0% to 100%.

The couplers 24, 26, 34 and 36 are linear, symmetric devices whose optical characteristics can be described by the operators t, $\pi$, r and $\tau$. Referring to the coupler 24 as exemplary of all the couplers in FIGS. 1 and 2, the four above-mentioned operators are defined in terms of the input and output signals from the coupler 24. That is $$L_{down} = r_1 L_{up} + \tau_1 R_{down} \tag{1}$$

and $$R_{up} = t_1 L_{up} + \pi_1 R_{down} \tag{2}$$

Equations (1) and (2) ignore losses in the coupler which are generally 5% or less. In physical terms, Equation (1) means that the light power of the light wave at port B at any instant is equal to the light power of the wave entering port A times the tunable coupling operator $r_1$ plus the light power of the wave entering at the port D times the transmission operator $\tau$, ignoring losses. The operator $\tau_1$ is equal to $r_1$, because the coupler is symmetric. Likewise, the light power of the light wave leaving at port C is equal to the light power entering at port A times the transmission operator $t_1$ plus the light power entering at the port D times the feedback coupling coefficient $\tau_1$ less, ignoring losses. The operators $r_1$ and $t_1$ are related as are $\tau_1$ and $\pi_1$ because of conservation of energy. That is:

$$r_1 + t_1 = 100\% \text{ approximately} \tag{3}$$

and $$\pi_1 + \tau_1 = 100\% \text{ approximately} \qquad (4)$$

Error should be within 5% because of losses in the coupler. Energy entering the coupler is neither created nor destroyed; thus, the same amount of energy that enters each coupler, less some small losses, must leave the coupler. Thus, when $r_1$ and $\tau_1$ are tuned to couple more power between the fibers, the operator $t_1$ and $\tau_1$ decrease in proportion to the increase in $r_1$ and $\tau_1$.

FIG. 3 illustrates an infinite-duration impulse response filter (IIR filter) which is assembled by cascading a plurality of recirculating delay lines of the type illustrated in FIG. 1. Specifically, this IIR filter includes one optical fiber feed-forward line 49 whose input is at $X_1$ and whose output is at $Y_2$. The filter also includes one optical fiber feed-backward line 50 whose input is at $X_2$ and whose output is at $Y_1$. At each of the directional couplers 51, 52, 53 and 54 a portion of the light signal is coupled between the feed-forward line 49 and the feed-backward line 50. However, to achieve an IIR filtering function, the light signals transmitted from a coupler's outputs do not simultaneously propagate in parallel to a successive common coupler. Rather, one signal propagates along the feed-forward line 49 to the successive coupler while the other propagates along the feed-backward line 50 to the prior coupler on the feed-forward line. Thus, a portion of the signal transmitted from the output of a directional coupler on the feed-forward line 49 will return from the immediately successive coupler via the feed-backward line 50 after an overall loop delay time interval T.

A particular filtering function may be obtained from an IIR fiber optic lattice filter by selecting the amount of light signal coupled between the fibers and by selecting the loop transmit times T associated with each of the filter's stages. In general, a different loop transit time T may be associated with each of the IIR filter's stages. This IIR fiber optic lattice filter exhibits the advantages of that corresponding class of non-optical filters which include being capable of extremely sharp frequency response with a small number of stages. The disadvantages of this filter are the complexity of its design, concern over filter stability, and the filter's intrinsically non-linear phase response.

FIG. 4 illustrates a non-recursive, FIR fiber optic lattice filter. This filter of FIG. 4 may be assembled by cascading a plurality of non-recursive delay lines of the type illustrated in FIG. 2. Thus, this FIR filter has two optical fiber feed-forward lines 55 and 56, respectively, originating at inputs $X_1$ and $X_2$, which respectively terminate at the outputs $Y_1$ and $Y_2$. Portions of a signal applied to either input $X_1$ or $X_2$ of this filter propagate down fibers 55 and 56 to both the outputs $Y_1$ and $Y_2$. A plurality of directional couplers 57, 58, 59 and 60, are provided to define coupling locations between fibers 55 and 56. At each of these directional couplers a portion of the signal on one fiber is coupled into the other fiber. The amount of signal transferred between the fibers depends upon the coupling operator $r_1$ which is a function of the properties of each individual coupler. That portion of the signal not coupled between fibers 55 and 56 continues propagating down the first fiber 55 to the successive coupler.

In general, depending upon each coupler's respective properties and upon the difference between the lengths of fibers joining two successive couplers, i.e., a stage in the filter, a pulsed light signal applied to one input of the first coupler will ultimately be transmitted from both outputs of the second coupler as two successive optical pulses. Further, the time delay between those pulses, T, is determined by the differences in inter-coupler delay established by the respective fibers' lengths. Differences in the pulses' optical strength on each fiber depends upon the directional couplers' respective properties. Lastly, a particular filtering function may be obtained by appropriately selecting both the amount of light signal coupled between fibers for each directional coupler and the time delay, T, associated with each of the filter's stages, i.e., a successive pair of directional couplers and the optical fiber joining them. In general, a different time delay T may be associated with each of a filter's stages.

The FIR fiber optic lattice filter of FIG. 4 is equivalent to a tapped delay line transversal filter. However, it has advantages over a tapped delay line filter in that the optical signals are summed within the filter's optical fibers, thereby both increasing the light collection efficiency and simplifying the detection system at the filter's output. Further, similar but not identical filtering functions may be obtained by using only the signal transmitted from the filter's output $Y_1$ or from its output $Y_2$.

A third, similar but not identical filtering function may be obtained by generating a difference signal between the signals transmitted from those outputs $Y_1$ and $Y_2$ of the FIR fiber optic lattice filter of FIG. 4. Being an FIR filter, this fiber optic device also exhibits that corresponding class of non-fiber optic filters' advantageous properties of inherent stability and good phase control which allows designing linear phase filters. The principal disadvantage of FIR filters whether of tapped delay line or lattice type, is that obtaining sharp filtering requires many stages of individual taps or of directional couplers. This need for many stages makes sharp FIR lattice filters difficult to fabricate and relatively expensive.

Filter configurations corresponding to those illustrated in FIGS. 3 and 4 are described, and their use in several particular signal processing applications is discussed, in U.S. Pat. No. 4,588,255 and titled "Optical Guided Wave Signal Processor for Matrix-Vector Multiplication and Filtering." This patent is hereby incorporated by reference herein.

A lattice filter is more general than a transversal filter in that it offers a transfer function which has both poles and zeros. In contrast, a transversal filter has only zeros. The physical significance of zeros in a transfer function is that the zeros represent frequencies of the input signal which the filter will block. As noted above, a transfer function represents the response of a system to an impulse input, i.e., an infinite series of sinusoids of different frequencies and the same amplitude. The transfer function is plotted in terms of amplitude of the output versus frequency. That is, the transfer function of the system is the output amplitude and phase of the system at each of the component frequencies of the input waveform.

The transfer function is a useful concept because every signal in the time domain can be thought of as a combination of different frequency sinusoids of different amplitudes. This series of sinusoids can be applied to any systems and the response of the system to each frequency sinusoid can be computed from the transfer function. The output will then consist of a combination of sinusoids having different amplitudes and phases than the corresponding input sinusoids by the action of the system on each frequency component as symbolized by the transfer function. These output sinusoids can be combined to derive the output signal in the time domain which results from application of the given input signal to the system. The input series of sinusoids is represented by the Fourier transform of the input signal.

Before describing the applications of the structures introduced above, the methods for accomplishing a mathematical analysis of these lattice structures will be discussed. The Z-transform is a convenient mathematical tool which simplifies the analysis of these systems. The use of such a transform is valid since these systems are linear and time-invariant, and because a basic discrete time delay can be defined such that any other relevant data in the system is an integral multiple of this basic delay. That is, the impulse response of the system comprises a series of impulses which are equally spaced in time. As a result, the mathematical analysis of these systems may be simplified by considering the values of the system signals only at discrete instances in time. Since the input and output are described in terms of discrete samples, the systems are referred to as sampled-data systems.

The input-output relationships of the system are described by transfer functions which are the ratio of the Z-transform of the output to the Z-transform of the input. The Z-transform, $F(z)$, of a signal, $f(k)$, is defined by the following expression.

$$F(z) \overset{\Delta}{=} \sum_{k=-\infty}^{\infty} f(k) z^{-k}, \qquad (5)$$

where k is the time index, which is a multiple integer of the basic time delay (k=nT), and z is the transform variable which represents a unit time advance ($z^{-1}$ represents a unit time delay).

The input-output relationships are also described by system transfer functions, which comprise the ratio of the Z-transform of the output to the Z-transform of the input. The "poles" and "zeros" of the system transfer functions are very important in the design and analysis of frequency-selective filters. For example, in general, the input frequencies corresponding to the poles pass through the system with less attenuation than the frequencies corresponding to the zeros. The frequency response is obtained when the transfer function is evaluated at $z = e^{j\omega T}$. This $e^{j\omega T}$ describes a unit circle centered at the origin of the Z-plane. This unit circle also plays an important role in predicting the stability of a system.

To insure stability, all the poles of the system transfer function must be inside the unit circle. Fiber lattice filters incorporating passive elements (elements having no gain) are sure to be stable. Furthermore, if all the zeros are also inside the unit circle, the system is called a minimum phase system; whereas, if any zero lies outside the unit circle, the system is called a non-minimum phase system. For a minimum phase filter, the phase response and the logarithm of the magnitude response are Hilbert transform pairs. Whereas, for a stable, causal system, the real and imaginary parts of the frequency response are Hilbert transformations of each other.

Using the Z-transform relationship as defined by Equation (5), the following expressions for the system transfer functions, $H(z)$, may be developed for the two-coupler delay lines of FIGS. 1(a) and 2(a).

(a) Two-coupler recirculating delay line, with $X_1$ as the input and $Y_1$ as the output (see FIG. 1(a)):

$$H_{11}(z) = \frac{a_1 + (1 - 2a_1) a_0 l_1 z^{-1}}{1 - a_1 a_0 l_1 z^{-1}}, \qquad (6)$$

where $a_1$ and $a_0$ are the intensity coupling coefficients of the couplers, and $l_1$ is the loop intensity transmittance of the system. As Equation (6) shows, this system has one zero at $$Z = \frac{(2a_1 - 1)}{a_1} a_0 l_1 \qquad (7)$$

and one pole at $z = a_1 a_0 l_1$.

(b) Two-coupler recirculating delay line, with $X_1$ as the input and $Y_2$ as the output (see FIG. 1(a)):

$$H_{21}(z) = \frac{(1 - a_1)(1 - a_0) l_{11}}{1 - a_1 a_0 l_1 z^{-1}}, \qquad (8)$$

where $l_{11}$ is the intensity transmission factor of the forward fiber line. In this case, the system has one zero at the origin and one pole at $z = a_1 a_0 l_1$.

(c) Two-coupler non-recirculating delay line, with $X_1$ as the input and $Y_1$ as the output (see FIG. 2(a)):

$$H_{11}(z) = (1 - b_1)(1 - b_0) l_{11} + b_1 b_0 l_{12} z^{-1}, \qquad (9)$$

where $b_1$ and $b_0$ are the intensity coupling coefficients of the couplers, and $1_{11}$ and $1_{12}$ are the intensity transmittances in the two feed-forward fiber lines. This system has one pole at the origin and one zero at $$z = -\frac{b_1 b_0 l_{12}}{(1 - b_1)(1 - b_0) l_{11}}. \qquad (10)$$

Note that those zeros or poles which are located at the origin do not affect the frequency response of the system, except for a linear phase factor. For this reason, the two-coupler recirculating delay line, with $Y_2$ as the output, is referred to as a first-order (one pole) all-pole system; whereas the two-coupler non-recirculating delay line and the two-coupler recirculating delay line, with $Y_1$ as the output, are referred to as first-order (one zero) all-zero and first-order (one pole) pole-zero systems, respectively.

All the structures of interest in the invention have, in general, two inputs and two outputs and are thus referred to as two-pair systems. In addition to the transfer matrix formulation, these systems may be characterized by the chain matrix formulation which is a method of characterization suitable for cascaded two-pair systems. The transfer matrix formulation is especially suitable for the analysis of cascaded feed-forward two pair systems, while the chain matrix method is best utilized for analysis of cascaded feed-backward two-pair systems. This method is explained in detail in F. K. Mitra, R. J. Sherwood, "Digital Ladder Networks", IEEE Trans. Audio Electroacoust., vol. AU-21, 30–36 (February 1973), which is incorporated herein by reference.

It is noted that by using the well known procedures set forth in the above reference, the chain and transfer matrices of the basic lattice sections of the filters of FIGS. 3 and 4 can be used to calculate the total chain and transfer matrices of higher order lattice structures. Using this approach, together with Z-transform techniques, general expressions for the transfer functions of lattice structures may also be obtained if desired.

Referring again to FIGS. 3 and 4 the two physical embodiments of the fiber optic lattice filter illustrated there may now be described in more detail. FIG. 3 shows an IIR embodiment of the filter with backward coupling by virtue of the direction of winding of the output fiber 50. FIG. 4 shows a FIR embodiment of the filter with forward coupling by virtue of an opposite direction of winding of the fiber 50 compared to the embodiment of FIG. 3. In FIGS. 3 and 4 it is seen that the output fibers 50 and 56 carry light through the couplers 51–54 and 57–60 in the same direction. However, the direction of winding of the output fibers 50 and 56 is such that in FIG. 3 the output signal leaves the filter in the opposite direction from the direction which the output signal leaves the filter in FIG. 4.

Specifically, in the FIG. 3 embodiment, the energy coupled from the input fiber 49 into the output fiber 50 in the coupler 52 returns in the fiber 50 and is coupled back into the input fiber 49 in the coupler 51 in proportion to the coefficient $\pi_1$. From the coupler 51, the feedback energy travels forward to the coupler 52 and is again coupled into the output fiber 50 in proportion to the coefficient $r_2$. The same is true of the energy coupled into the output fiber 50 in each of the couplers 52–54, i.e., the energy is returned to the previous coupler. This structure creates feedback coupling which can be advantageously used to create a lattice filter because it provides for poles or peaks in the transfer function which are programmable in location to some extent.

Programmable lattice filters are very desirable because they offer more degrees of freedom for the designer in terms of the number of transfer functions which are available, i.e., the transfer function can be tailored to the specific application. In the embodiment of FIG. 3, a certain class of lattice filters can be implemented. A truly general optical lattice filter structure would require completely independent selection of the coefficients t, $\tau$, r and $\pi$ such that any of the four operators which describe the coupler could be any number, positive or negative, and either more or less than one. With known couplers of the tupe designated herein, the coefficients t, $\tau$, r and $\pi$ are not independent, but instead are all determined relative to each other once the coupling operator r is established; that is, the coupling operator r establishes $\pi$ and therefore also establishes t and $\tau$ by conservation of energy. Further, because the couplers 50–54 are passive, no amplification in the couplers is available. Therefore all the coefficients r, $\pi$ t and $\tau$ are positive and between zero and one.

Nevertheless certain lattice filter transfer functions can be implemented with the structure of FIG. 3, and adjustments in the transfer function can be made. These adjustments are made by varying the lengths of the output fiber 50 between the couplers 51–54 and by varying the lengths of the input fibers between the couplers 51–54. Further adjustments in the transfer function can be made by adjusting the coupling operator r in any or all of the couplers 51–54.

The scattering and recirculation effects in the fiber lengths between the couplers allow the system of FIG. 3 to also be used to model physical phenomena described by the Redheffer scattering formalism. A physical system such as light passing through a series of plane, two-way, partially reflecting and partially transmitting mirrors is described by this Redheffer formalism and is analogous to the feedback to the embodiment of FIG. 3.

In contrast to the embodiment of FIG. 3, in the filter of in FIG. 4, energy coupled into the output fiber 56 is fed forward to the next coupler. More precisely, in FIG. 4 it can be seen that feed forward energy is coupled in the coupler 57 by the coefficient $r_1$ from the input fiber 55 to the output fiber 56. This energy travels through the extended length of fiber 56 and enters the coupler 58 at the port D. In the coupler 58, the energy is coupled back into the input fiber 55 in proportion to the coupling coefficient $\pi_2$. From the coupler 59 this energy is recoupled back into the output fiber 56, and so on. At each coupling, the amount of this energy is reduced by the coupling coefficient which is always less than 1. The energy, therefore, continues to grow smaller with each coupling. The embodiment of FIG. 4 can be used as a transversal filter having a number of taps equal to the number of couplers.

Transversal filters are well known in the art, and optical tapped delay lines have been used to implement them. For example, H. F. Taylor described a fiber optic transversal filter in "Fiber and Integrated Optical Devices For Signal Processing", published in SPIE, Vol. 176, *Guided Wave Optical Systems & Devices* (1979) at page 17. As described by Taylor, transversal filters are used in signal processing applications to implement narrow band filters and matched filters. The Taylor tapped delay line transversal filter uses individual modulators on fibers of different lengths and combines the optical outputs in a single photodetector. The individual modulators vary the tap weights and the individual fiber lengths determine the delay between taps and determines the tap spacing. Taylor's filter requires a single photodetector which would be optically coupled to the ends of all the individual fibers in the bundle, which detector would, of necessity, be of large physical dimensions. A transversal filter utilizing the embodiment of FIG. 4 would not need such a large photodetector, which is a significant advantage since small photodetectors can operate faster, i.e., at higher frequencies than large photodetectors.

E. Marom suggested a structure similar to the structure of FIG. 4 to implement a matched filter in optical delay line terms in U.S. Pat. No. 4,159,418. Marom's structure did not use variable directional couplers and used two multimode fibers, both carrying light signals in the same direction. In contrast, the applicant's structure of FIG. 4 provides variable coupling at the positions of the couplers 57–60 and uses monomode fibers, thereby eliminating the dispersion effects caused by multimode fibers. The variable couplers used in FIG. 4 allow the transfer function of the system to be programmed. That is, the zeros and poles in the transfer function can be moved to change the frequency characteristics of the filter by changing the tuning of the couplers. Further, the length of fiber between the couplers can be changed to alter the transfer function somewhat. Such programmability of the transfer function gives the designer greater flexibility in his designs.

Referring to FIGS. 5–8, a description of the embodiment of the couplers 51–54 and 57–60 will be given. As illustrated in FIGS. 5 through 8, the couplers of the present invention includes two strands 45 and 46 of a single mode fiber optic material mounted in longitudinal arcuate grooves 63A and 63B, respectively, formed in flat, confronting surfaces 64A and 64B, respectively, of rectangular bases or blocks 66A and 66B, respectively. The block 66A with the strand 45 mounted in the groove 63A will be referred to as the coupler half 70A, and the block 66B with the strand 46 mounted in the groove 63B will be referred to as the coupler half 70B.

Each of the strands 45 and 46 comprises a commercially available fiber of quartz glass which is doped to have a central core and an outer cladding. It will be seen below that the present invention is particularly advantageous for use with single mode fibers, which typically have a core diameter on the order of 10 microns or less and a cladding diameter on the order of 125 microns. However, the invention may also be employed with other types of fibers, such as multimode fibers. In the embodiment disclosed, single mode fibers are utilized; however, for clarity of illustration, the diameter of the strands 45 and 46 and their respective cores are exaggerated. Furthermore, test results described herein are for couplers utilizing single mode fibers.

The arcuate grooves 63A and 63B have a radius of curvature which is very large compared to the diameter of the fibers 45 and 46 and have a width slightly larger than the fiber diameter to permit the fibers 45 and 46, when mounted therein, to conform to a path defined by the bottom walls of the grooves 63. The depth of the grooves 63A and 63B varies from a minimum at the center of the blocks 66A and 66B, respectively, to a maximum at the edges of the blocks 66A and 66B, respectively. This advantageously permits the fiber optic strands 45 and 46, when mounted in the grooves 45 and 46, respectively, to gradually converge toward the center and diverge toward the edges of the blocks 66A, 66B, thereby eliminating any sharp bends or abrupt changes in direction of the fibers 45 and 46 which may cause power loss through mode perturbation. In the embodiment shown in FIG. 6, the grooves 63 are illustrated as being rectangular in cross-section; however, it will be understood that other suitable cross-sectional contours which will accommodate the fibers may be used alternatively, such as a U-shaped cross-section or a V-shaped cross-section.

At the centers of the blocks 66, in the embodiment shown, the depth of the grooves 63 which mount the strands 45 and 46 is less than the diameter of the strands, while at the edges of the blocks 66, the depth of the grooves is preferably at least as great as the diameter of the strands. Fiber optic material is removed from each of the strands 45 and 46 as shown at 78b in FIG. 8 to form the respective, identical, oval-shaped planar surfaces 78A, 78B, which are coplanar with the confronting surfaces 64A, 64B, respectively. These surfaces 78A, 78B will be referred to herein as the fiber "facing surfaces". Thus, the amount of fiber optic material removed increases gradually from zero towards the edges of the block 66 to a maximum towards the center of the block. This tapered removal of the fiber optic material enables the fibers to converge and diverge gradually, which is advantageous for avoiding backward reflection and excess loss of light energy.

In the embodiment shown, the coupler halves 70A and 70B are identical, and are assembled by placing the confronting surfaces 64A and 64B of the blocks 66A and 66B together, so that the surfaces 78A and 78B of the strands 45 and 46 are in facing relationship.

An index matching substance (not shown), such as index matching oil, is provided between the confronting surfaces 64. This substance has a refractive index approximately equal to the refractive index of the cladding, and also functions to prevent the optically flat surfaces 64 from becoming permanently locked together. The oil is introduced between the blocks 66 by capillary action.

An interaction region 72 is formed at the junction of the strands 45 and 46, in which light is transferred between the strands by evanescent field coupling. It has been found that, to ensure proper evanescent field coupling, the amount of material removed from the fibers must be carefully controlled so that the spacing between the core portions of the strands 45 and 46 is within a predetermined "critical zone". The evanescent fields extend into the cladding and decrease rapidly with distance outside their respective cores. Thus, sufficient material should be removed to permit each core to be positioned substantially within the evanescent field of the other.

If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 45 and 46 is within the critical zone, each strand receives a significant portion of the evanescent field energy from the other strand, and optimum coupling is achieved without significant energy loss.

The critical zone is illustrated schematically in FIG. 9 as including that area, designated by the reference numeral 73, in which the evanescent fields, designated by reference numerals 74A and 74B, of the fibers 45 and 46, respectively, overlap with sufficient strength to provide coupling, i.e., each core is within the evanescent field created by the light traveling in the other core. However, as previously indicated, mode perturbation occurs within the area 73 when the cores are brought too close together. For example, it is believed that, for weakly guided modes, such as the $HE_{11}$ mode in single mode fibers, or high order modes in multimode fibers, such mode perturbation begins to occur when sufficient material is removed from the fibers to expose their cores. Thus, the critical zone is defined as that area in which the evanescent fields 74 overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown in FIGS. 5-8, for example, the required center-to-center spacing between the strands 45 and 46 at the center of the coupler as shown in FIG. 7 is typically less than a few (e.g., 2-3) core diameters.

Preferably, the strands are (1) identical to each other, (2) have the same radius of curvature at the interaction region 32, and (3) have an equal amount of fiber optic material removed therefrom to form their respective facing surfaces 78A and 78B. Thus, the fibers 45 and 46 are symmetrical, through the interaction region 72, in the plane of the facing surfaces 78, so that the facing surfaces 78 are coextensive if superimposed. This ensures that the two fibers 45 and 46 will have the same propagation characteristics at the interaction region 72, and thereby avoids coupling attenuation associated with dissimilar propagation characteristics.

The blocks or bases 66A and 66B may be fabricated of any suitable rigid material. In one presently preferred embodiment, the bases comprise generally rectangular blocks of fused quartz glass approximately one inch long, one inch wide, and 0.4 inch thick. In this embodiment, the fiber optic strands 45 and 46 are secured in the slots 63 by suitable cement 79, such as epoxy glue. One advantage of the fused quartz blocks 66 is that they have a coefficient of thermal expansion similar to that of glass fibers, and this advantage is particularly important if the blocks 66 and fibers 45 and 46 are subjected to any heat treatment during the manufacturing process. Another suitable material for the block 66 is silicon, which also has excellent thermal properties for this application.

The coupler includes four ports labeled A, B, C, and D, in FIG. 5. When viewed from the perspective of FIG. 5, ports A and D, which correspond to strands 45 and 46, respectively, are on the left-hand side of the coupler, while the ports B and C, which correspond to the strands 45 and 46, respectively, are on the right-hand side of the coupler. For the purposes of discussion, it will be assumed that input light is applied to port A. This light passes through the coupler and is output at port C and/or port B, depending upon the amount of power that is coupled between the strands 45 and 46. In this regard, the term "normalized coupled power" is defined as the ratio of the coupled power to the total output power.

In the above example, the normalized coupled power would be equal to the ratio of the power at port B to the sum of the power output at ports B and C. This ratio is also referred to as the "coupling efficiency" and when so used is typically expressed as a percent. Thus, when the term "normalized coupled power" is used herein, it should be understood that the corresponding coupling efficiency is equal to the normalized coupled power times 100. In this regard, tests have shown that the coupler of the type shown in FIG. 5 has a coupling efficiency of up to 100%. However, the coupler may be "tuned" to adjust the coupling efficiency to any desired value between zero and the maximum of 100% power coupling, by offsetting the facing surfaces of the blocks 16A and 16B.

Tuning the coupler changes the coupling efficiency and changes the coupling and transmission operators r, ρ, τ and t. That is, when the coupling efficiency is lowered, less power is coupled from part A to part B in FIG. 5. That means that r and ρ are decreased because the coupler is symmetric and that t and τ are increased since less energy leaving either fiber for the other means more energy remains in the original fiber and is transmitted through the coupler by conservation of energy. Such tuning is preferably accomplished by sliding the blocks 66A and 66B laterally relative to each other in the direction of the arrow in FIG. 7.

The coupler is sensitive to displacements of the fibers in a direction which laterally offsets the planar faces such as the direction of the arrow in FIG. 7. However, the coupler is less sensitive to displacements which longitudinally offset the planar faces, i.e., in a direction perpendicular to he arrow in FIG. 7 and coming out of the page in orthogonal fashion. The coupler is relatively insensitive to displacement of the fibers which rotationally offsets the faces. The sensitivity of the coupling operators to displacement of the fibers depends upon the spacing of the cores of the fibers when the fibers are superimposed.

The coupler is highly directional, with substantially all of the power applied at one side of the coupler being delivered to the other side of the coupler. That is, substantially all of the light applied to input port A is delivered to the output ports B and C, without contradirectional coupling to port D. Likewise, substantially all of the light applied to input port D is delivered to the output ports B and C. Further, this directivity is symmetrical. Thus, light supplied to either input port C or input port B is delivered to the output ports D or A, respectively, and light supplied to either port A or port D is defined either to the port B or C respectively. Moreover, the coupler is essentially nondiscriminatory with respect to light polarizations, and preserves the polarization of the coupled light during the power transfer. Thus, for example, if a light beam having a vertical polarization is input to port A, the light coupled from port A to port B as well as the light passing straight through from port A to port C will remain vertically polarized.

Figure 10:
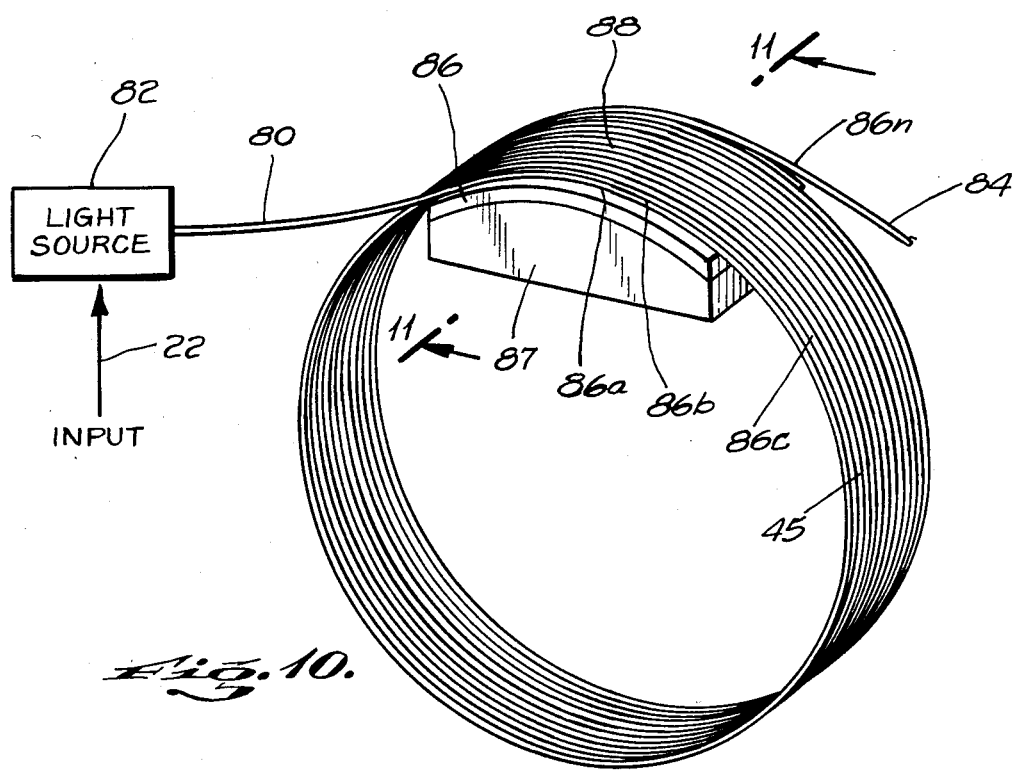
FIG. 10 shows a tapped delay line which, in combination with another of its type, could be used as a substitute for the individual couplers in the filters of FIGS. 1 through 4 to implement those filters.
Figure 11:
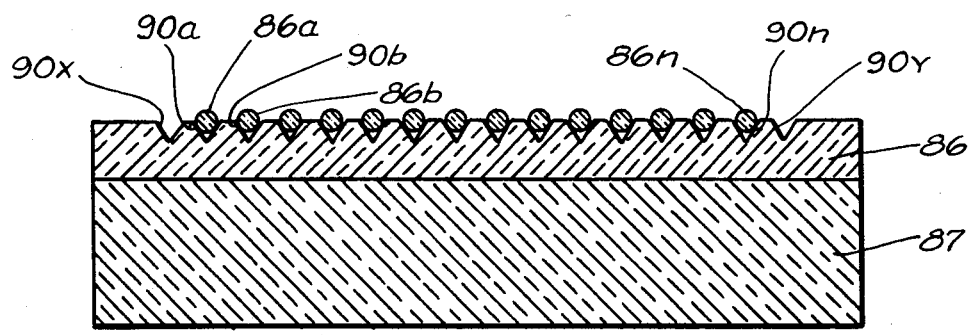
FIG. 11 shows a cross sectional view of the tapped delay line structure of FIG. 10, taken along the view line 11—11 in FIG. 10.
Figure 12:
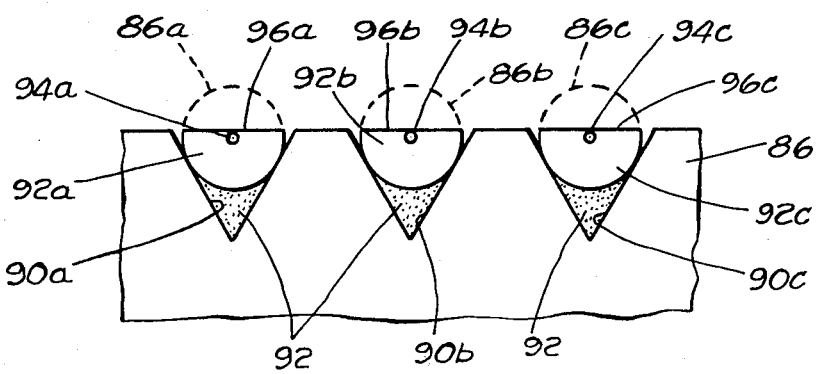
FIG. 12 shows a closeup view in cross section of the first three grooves of FIG. 11.

Referring to FIGS. 10-12 there is shown the construction for a fiber optic tapped delay line which could be used to implement the filters depicted in FIGS. 3 and 4. Two of the constructions shown in FIG. 10 optically coupled together at the taps could implement the arrays of FIGS. 3 and 4 as will be apparent from the following discussion. In FIG. 10, a single element of optical fiber 45 is used, beginning at an input end 80 which is supplied with a light input signal from a light source 82, and ending at an output end 84. The optical fiber 45 is wound around a chip 86 with V-grooves 90a–90y formed therein. The chip 86 is a thin slice of silicon with grooves 90a–90y photolithographically etched therein and will be described in more detail later. The first portion of the fiber on the chip is designated the first winding 86a, and the second portion of the fiber 45 mounted on the chip 86 is designated 86b, and so on. At a lateral line 88 normal to the longitudinal axes of the fiber segments 86a–86n, taps are constructed so that each revolution of the optical fiber 45 is tapped at the lateral line 88.

The construction of the chip 86 and the V-grooves and the manner by which the optical fiber 45 is laid in the V-grooves in the chip 86 is described in more detail in U.S. Pat. No. 4,558,920 for "Tapped Optical Fiber Delay Line". Standard photolithographic etching techniques known in the semiconductor industry can be used to form the V-grooves in the chip 86.

There is a need for great precision in the construction of the V-grooves such that they all are identical in width and depth since the fiber segments of the fiber 45 in the grooves must be coplanar. Any technique which will meet that criterion can be used such as by laser or other chemical or mechanical machining. It has been found it is satisfactory to use 100 oriented silicon for the chip 86 with chemical etching by photolithographic techniques as is well known in the semiconductor manufacturing art. Silicon of the 100 orientation yields a V-groove with walls at an angle of 54.74 degrees.

The first step in forming the V-grooves is photolithographically etching flat grooves with the width of the flat grooves determined by the depth needed of the V-groove. The depth of the V-groove needed depends upon the size of the fiber being used.

Referring to FIG. 10, the preferred way to construct an optical tap is to have the optical fiber surface mounted in a curved configuration so that a flat portion of the optical fiber may be lapped to form a planar face to provide a tap of the light traveling within the fiber. To provide this curved configuration, the silicon chip 86 is mounted on a block of quartz 87 which has a curved upper surface. It has been found that a silicon chip of standard thickness (0.25 millimeter) and about three-centimeter length can be bent without breaking around a twelve-inch radius. An adhesive substance such as wax is used to hold the silicon chip 86 on the quartz block 87 in the curved configuration shown in FIG. 10. The optical fiber 45 may now be mounted on silicon chip 85.

Before the optical fiber 45 can be mounted in the V-grooves in the silicon chip 85, the portions of the optical fiber 45 which are to be mounted in the V-grooves preferably have the protective jacket removed. ITT type monomode fiber has a plastic jacket which may be removed by dipping it in sulfuric acid. The resiliency of the plastic jacket prevents precision in the lapping operation, so it should be removed. Corning type fiber has a lacquer jacket which may be removed by dipping it in acetone. Since the lacquer jacket is more solid than the plastic jacket, its removal is preferential rather than mandatory.

Figure 19:
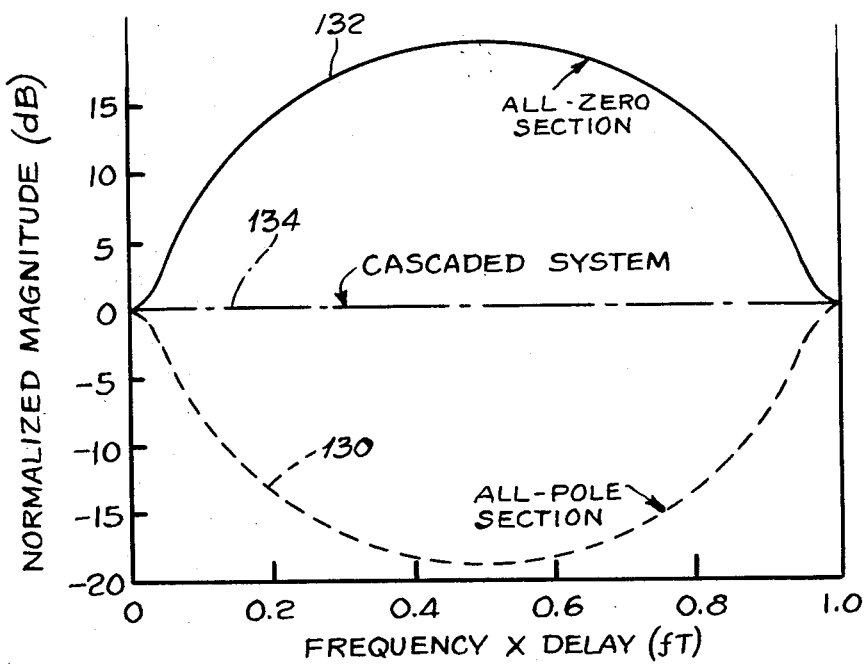
FIG. 19 is a plot of normalized magnitude vs. frequency times delay for the cascaded filter of the present invention, along with plots of its recursive and non-recursive sections.

The installation of the fiber 45 in the V-grooves of the silicon chip 85 is best shown in FIG. 11 which shows a cross-sectional view along the line 11—11 in FIG. 10. FIG. 19 shows a cross-section of the first three grooves in more detail. A portion of the optical fiber 86a near the input end 80 of the fiber is mounted in the second V-groove 90a of the silicon chip 85. It should be noted that there is a first V-groove 90x which is not used to receive the optical fiber 45, but rather is used for alignment purposes. As shown in FIG. 12, before the fiber is mounted in the V-groove 90a, an adhesive substance 92 is placed in the bottom of the V-groove 90a. Therefore, when the portion 86a of the optical fiber 45 is placed in the V-groove 90a and the optical fiber 45 bottoms out against the sides of the V-grooves 90a, it will be permanently retained there by the adhesive 92.

Following the placement of fiber portion 86a in the first V-groove 90a, a length L of the optical fiber is left between the center of the fiber portion 86a and the center of the second fiber portion 86b of the optical fiber 45, which is to be mounted in the second V-groove 86b. This length L is the length of optical fiber shown as one of the fibers forming the loop of fiber 45 in FIG. 10. It provides a delay time equal to the period of the desired fundamental frequency of the transversal filter or the desired loop delay for the matrix-vector multiplier to be constructed using the structure of FIG. 10.

It can be seen from FIGS. 10-12 that the optical fiber 45 is wound around the silicon chip 86 so that upon each successive revolution it is fitted into the next succeeding V-groove and secured there by the adhesive 92. When the last portion 86n of the optical fiber 45 has been fitted into the last V-groove 90n of the silicon chip, the optical fiber 45 terminates at the end 84 as shown in FIG. 10.

The next step is to mechanically lap the upper surface of the portions 86 of the optical fiber 45 at the lateral line 88. The portions 86 of the optical fiber 45, being mechanically mounted in the silicon chip by the adhesive 92, are stable enough to have portions of the cladding removed by lapping. This lapping operation will remove a portion of the cladding 92 to form a planar face similar to the face 78b, shown in FIG. 8. It is important to note that not all of the cladding material 92 (92a-c in FIG. 12) around the core 94 (94a-c in FIG. 12) of the optical fiber is to be removed. The distance between each core 94 and the lapped surface 96 of the fiber segments 86 in the V-grooves depends on the amount of light which is to be removed from the fiber at each tap. When small amounts of light are being extracted, the lapped surface 96 should be further from the core 94 of the fiber segments 86. Since it is desirable to have a high number of taps for certain applications, only a small amount of light can be removed at each tap. Therefore, between approximately five and ten microns of cladding will be left between the lapped surface 96 and the core 94 of each of the fiber segments 86.

Figure 13:
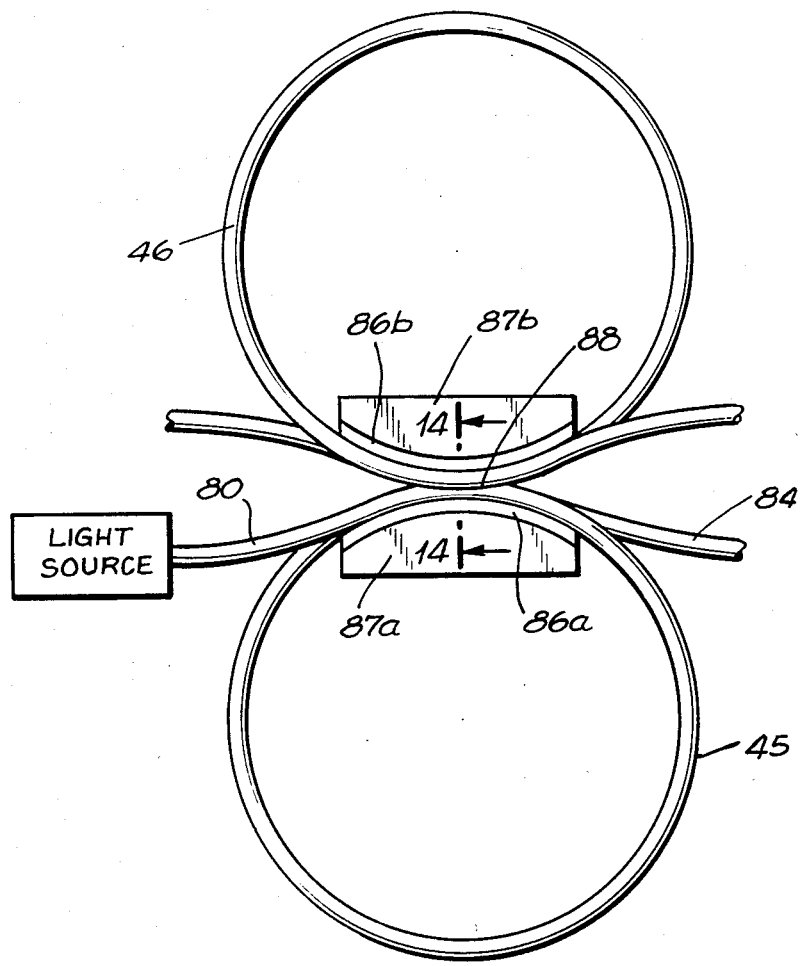
FIG. 13 is an alternative embodiment for either of the structures of FIGS. 1 and 2.
Figure 14:
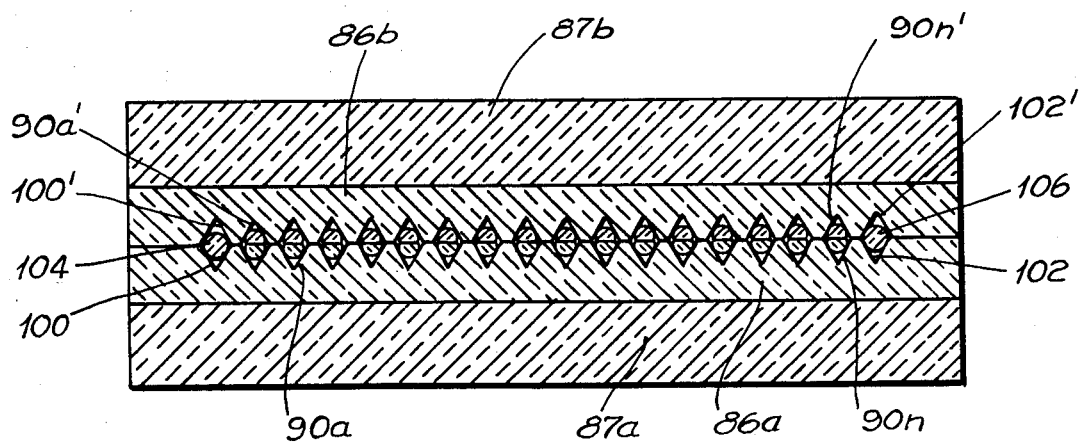
FIG. 14 is a cross sectional view of the structure of FIG. 13 in the optical coupling region taken along the view line 14—14.

To implement the arrays of FIGS. 3 and 4, two structures such as shown in FIG. 10 must be used which are optically coupled at the lapped portions of the fiber segments 86 at the line 88. This is illustrated in FIGS. 13 and 14. FIG. 13 shows the combined structure representing the structure of either FIG. 3 or FIG. 4 with the number of couplers equal to the number of turns of the fibers 45 and 46 in the V-grooves. Whether the structure of FIG. 13 represents the structure of FIG. 3 or FIG. 4 depends upon the direction of the winding of the fiber 46. That is, if the fiber 46 is wound so as to carry the coupled light back to the next preceding tap, i.e., in the direction from which the light in the input fiber 45 came, then feedback or backward coupling is present and the structure can function as a lattice filter. If the winding direction is opposite, a transversal or matched filter will be implemented.

FIG. 14 shows a cross-section of the structure of FIG. 13 taken along the view line 14—14 in FIG. 13 corresponding to the line 88 in FIGS. 10 and 13. The structure is simply two chips 86a and 86b with V-grooves therein and supported by curved quartz blocks 87a and 87b affixed together such that the V-grooves 90a-90n in the chip 86a are in predetermined alignment with the V-grooves 90a'-90n' in the chip 85b. Alignment grooves 100 and 100' and 102 and 102' at the opposite ends of the chips 86a and 86b contain alignment beads 104 and 106. These alignment beads 104 and 106, and their corresponding alignment grooves, establish fixed reference points from which each of the V-grooves 90a-90n and 90a'-90n' can be precisely located. If it is desired that each coupler formed by a pair of V-grooves have the same coupling operators r and $\rho$ as each of the other couplers, then each pair of grooves forming a coupler should be located the same distance from the alignment grooves plus a selected differential offset of one groove in the pair relative to the other groove so that each fiber pair has the same relative offset as each other pair. In some applications of lattice or transversal filtering this equal weighting of taps will be desirable.

It is also possible to form couplers with unequal coupling at each tap using the structure of FIGS. 13 and 14. In such applications the relative offsets of each of the fiber pairs in the opposing grooves can be established by varying the distance of one of the opposing grooves from the alignment groove versus the distance to the alignment groove for the opposite V-groove. Since the photolithographic operation described above can be controlled to within reasonable tolerances, such a method of offsetting the V-grooves can give filters with weighted taps.

Of course the weights can all be simultaneously changed by moving the blocks 87a and 87b relative to each other, but all the couplers will have their fiber pair offsets equally affected by the same amount which will result in new weights determined by the original weights plus the common offset. No individual control of the coupling efficiencies will be possible. Of course for certain applications, such a non-adjustable coupler situation is satisfactory such as in filters requiring fixed pole and zero locations in the transfer function. For individual control of the coupling efficiencies of each coupler in the array, the embodiments of FIGS. 3 and 4 must be used. The advantage of the embodiment of FIGS. 13 and 14 is that many couplers can be inexpensively built to implement very complicated transfer functions and to precisely tailor the pass and stop bands of the lattice and transversal filters by many different tap weights.

To this point, the structure and method of use of both recursive and non-recursive fiber optic lattice filters has been discussed, along with methods for mathematically representing and analyzing the operation of those filters. In addition, transfer functions have been developed representative of the two-coupler recirculating and non-recirculating fiber optic delay filters illustrated in FIGS. 1 and 2.

Through use of the delay filters of FIGS. 1 and 2, the fiber-optic lattice filters of FIGS. 3 and 4 are constructed. Referring specifically to the non-recursive fiber-optic lattice filter of FIG. 4, the use of Z-transform techniques provides the following expression for the transfer function of this filter:

$$H_{az}(z) = 1 + c_1 z^{-1} + c_2 z^{-2} + \ldots + c_N z^{-N} \quad (11)$$
$$= (1 - z_1 z^{-1})(1 - z_2 z^{-1}) \ldots (1 - z_N z^{-1}),$$

where the $c_i$'s are positive-valued and are functions of the coupling coefficients, and the $z_i$'s are the zeros of the transfer function. This transfer function is an all-zero type, with its poles located either at the origin or at infinity.

By expanding Equation (11) into its real and imaginary parts and also using the fact that the $c_i$'s are non-negative variables, we can conclude that, for a positive non-recursive filter, there cannot be any zero of the transfer function in the angular sector $|\theta| < \pi/N$, where $\theta$ represents the polar angle in the Z-plane, and N is the order of the system. This inequality can also be used to estimate minimum order of the system required to realize a given zero pattern. Moreover, it is easy to show that, for such systems, not all the zeros can be located in the right hand Z-plane, unless sections allowing negativity are incorporated.

Frequency responses of non-recursive fiber lattice filters are similar to those of a transversal filter (tapped delay line). As an example, frequency responses of a first-order non-recursive fiber lattice filter, when coupling coefficients of both couplers are 0.5, are shown in FIG. 15. This filter can be used as a notch filter to block frequencies around $\omega T = \pi$, where T is the time delay difference between the two feed-forward fiber lines.

These non-recursive fiber lattice filters have all the advantageous features of non-recursive systems, such as inherent stability and good phase control properties in addition to all the features of lattice structures mentioned before. In particular, the fact that summations are done optically within the fiber, simplifies the detection system as compared to that of a fiber transversal filter, and also increases the light-collection efficiency.

The most unpleasant feature of non-recursive filters, whether of the transversal or the lattice type, is that they cannot provide very sharp filtering unless the filter order, N, is very high. This is undesirable since higher order filters are more difficult to fabricate and also more costly.

Referring now to FIG. 3, the chain matrix method described above may be used to show that the transfer function $H_1(z)$, from $X_1$ to $Y_1$ has both poles and zeros which are dependent on each other. In other words, the poles and zeros cannot be adjusted independently of each other. This is, in general, an undesirable feature that can be removed by using the output $Y_2$ on the feed-forward line 49.

Through use of the chain matrix approach, the transfer function, $H_2(z)$, from $X_1$ to $Y_2$ is an all-pole transfer function. This means that all the zeros are located either at the origin or at infinity, so that the poles can be adjusted independently. Therefore, for filtering applications it is preferred to use the output $Y_2$ so as to achieve an all-pole filter. The transfer function of this all-pole filter can be represented, within a constant proportionality factor, by:

$$H_{ap}(z) = \frac{1}{(1 - p_1 z^{-1})(1 - p_2 z^{-1}) \ldots (1 - p_N z^{-1})}, \quad (12)$$

where $p_i$'s are the poles of the transfer function.

If the phase response of the filter is not important, better filters can be designed using IIR structures of FIG. 3. This is true because the poles of a pole-zero IIR filter can be arranged in such a way as to keep the magnitude of the frequency response flat in some specified frequency range, and then the zeros can be used to force the frequency response to zero. As a result, low order IIR filters can be used to produce extremely sharp frequency responses. This is the most advantageous feature of the IIR normal case structures. Among the disadvantageous features, which stem from the existence of feedback loops, are complexity of the design, stability concerns, and non-linear phase response wherein the structure can be equalized to be arbitrarily close to linear, but intrinsically because of the closeness of the poles and zeros there can be a large phase change in the transition regions.

A further limitation with respect to both of the fiber optic lattice filters of FIGS. 3 and 4 is that they are positive systems. That is, these lattice filters employ light intensity as the signal carrying medium and negative signal values are impossible in this medium. Further, the filters employ directional couplers which can only additively, rather than subtractively, transfer light signals between the fibers. Thus, only positive-valued signals may be applied to and processed within the filters. The absence of negativity in these fiber optic lattice filters of FIGS. 3 and 4 limits the regions of the Z-transform plane in which poles and zeros of the respective filter classes may be located.

In contrast, lattice filters employing digital filtering techniques have parameters which can assume both positive and negative values, and therefore they can cover more area of the Z-plane. This undesirable condition in the fiber optic arena may be overcome by combining positive filter sections with sections allowing negativity. Such a system which utilizes the filter components previously described for overcoming these problems may be described with respect to FIG. 15.

FIG. 15 illustrates a block diagram of a combined filter system which includes a filter section 100 comprising an all-pole, recursive fiber optic lattice filter corresponding to the filter arrangement of FIG. 3. The output from the all-pole filter 100 is fed to an all-zero filter section 102 in cascaded form. Filter section 102 corresponds to the all-zero non-recursive fiber optic lattice filter arrangement illstrated in FIG. 4. The output from filter section 102 is transmitted to a detection system 104 which functions to detect the output signals and possibly to provide negativity in the system, and will be discussed more fully hereafter.

In the cascaded filter arrangement of FIG. 15, the poles and zeros of the combined system may be adjusted independently of each other. As a result, a desirable pole-zero pattern in the Z-plane may be arranged in order to realize more complex frequency responses.

The elements of sections 100 and 102 of the cascaded filter of FIG. 15 may be described in more detail by reference to FIG. 16, which illustrates a simple, first-order, all-pass filter. Specifically, section 100 includes a first-order all-pole lattice filter corresponding to the physical arrangement of couplers 51 and 52 and associated optical fibers 49 and 50 of FIG. 3. Section 102 comprises a first-order all-zero lattice filter corresponding to coupler 57 and associated optical fibers 55 and 56 of the arrangement of FIG. 4.

In the embodiment of FIG. 16, the input signal is received on the $X_1$ input of the all-pole filter 100. The output from that section corresponds to the $Y_2$ output of the all-pole filter arrangement of FIG. 3. The output from section 100 is connected to the input of the all-zero filter section 102, corresponding to the $X_1$ input of the filter of FIG. 4. The filtered signal from section 102 is transmitted outwardly via lines 55 and 56 on outputs $Y_1$ and $Y_2$ which are interconnected to the subtractive detection system 104 which processes the optical signals so as to provide an electronic output signal on line 106. The signal on 106 comprises the filtered signal which includes negativity.

The total transfer function for the filter described by sections 100 and 102 of FIG. 16 is given by the product of the two subsystem transfer functions. Thus, with a constant delay factor, the transfer function for the general case with any number of cascade feed-forward and feed-backward stages is:

$$H_{total}(z) = H_{az}(z) \cdot H_{ap}(z) \qquad (13)$$
$$= K \frac{(z - z_1)(z - z_2) \ldots (z - z_N)}{(z - p_1)(z - p_2) \ldots (z - p_N)},$$

where K is a constant, the $z_l$'s are the zeros and the $p_l$'s are the poles of the transfer function. The degrees of the numerator and denominator polynomials are assumed to be equal.

The filter described by FIGS. 15 and 16 is a simple, first-order, all-pass filter. This is a special case of an IIR filter in which the magnitude of the frequency response of the filter is constant and only the phase response changes as the pole and zero positions vary. The impulse response of the filter stages 100 and 102, without being processed in detection system 104, is illustrated in FIG. 17(a).

Figure 17A:
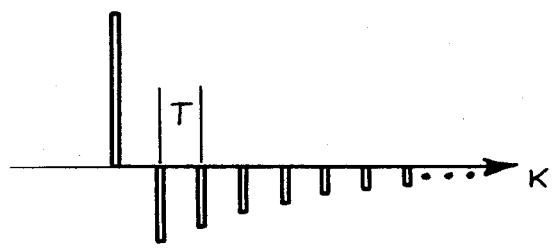
FIG. 17(a) is a plot of the impulse response of the first order all-pass filter of FIG. 16.

Reference to FIG. 17(a) makes it clear that, without more, an all-fiber, all-pass filter cannot be realized in this manner. This is due to the fact that the impulse response is not positive at all times. As is evidenced in FIG. 17(a), the impulse response is positive at the origin, and zero or negative at other times. As was previously discussed, because light intensity is utilized as the signal-carrying medium, negative values are not possible and thus only positive-valued signals may be applied to and processed within the filter.

Figure 17B:
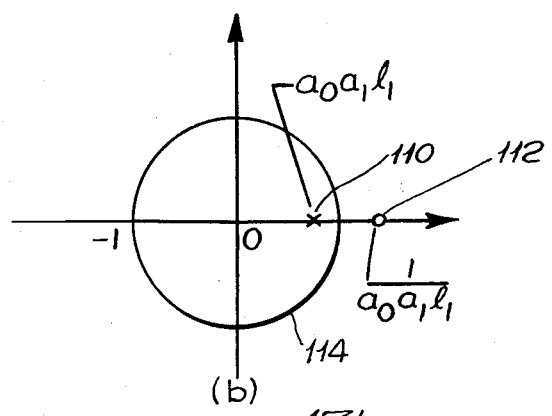
FIG. 17(b) is a pole-zero diagram of the transfer function of the first order all-pass filter of FIG. 16.

In terms of pole-zero locations in the Z-plane, the impulse response of FIG. 17(a) indicates that for every pole at $z = re^{j\theta}$, there must be a zero at $1/r \cdot e^{j\theta}$. In other words, as is illustrated in FIG. 17(b), the poles 110 and zeros 112 are reflections of each other with respect to the unit circle 114 for the simple first order case. Therefore, for the first-order all-pass filter, the transfer function is given with the proportionality factor by:

$$H(z) = \frac{z - 1/(a_1 a_0 l_1)}{z - a_1 a_0 l_1}, \qquad (14)$$

where the parameters are as defined before. From the above transfer function we can conclude that:

$$|H(e^{jwT})| = \frac{1}{a_1 a_0 l_1}, \qquad (15)$$

which is constant for a fixed pole-zero position, whereas the phase is a nonlinear function of $\omega$.

Figure 18:
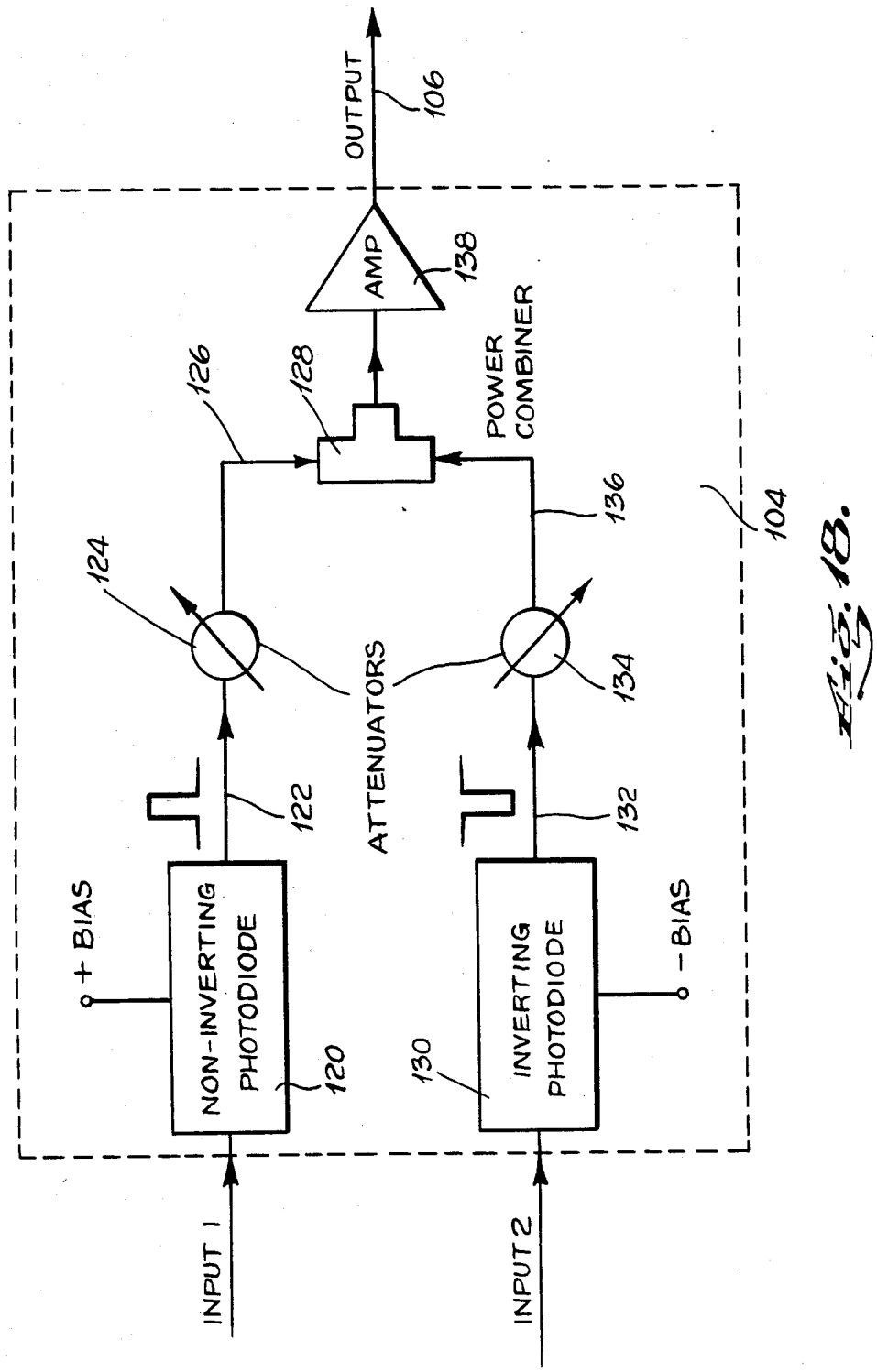
FIG. 18 is a block diagram of one preferred embodiment of an electronic subtractive detection system for use in the present invention.

In order to overcome the reflection condition between the poles and zeros, the detection system 104 of FIG. 16 is included to remove the lack of negativity. This is accomplished by applying the respective output signals from the $Y_1$ and $Y_2$ outputs of the all-zero filter section 102 to a receiver which generates a difference signal between them to provide the desired negativity function. FIG. 18 illustrates one preferred embodiment of circuitry which may comprise the detection system 104.

Referring to FIG. 18, it is seen that the output signal on line 55 of section 102 from terminal $Y_1$ is transmitted to a non-inverting photodiode 120 having a positive bias. The electronic signal from photodiode 120 is transmitted via line 122 to an attenuator 124 which is used to adjust the magnitude of the output current from line 122. From attenuator 124, the output signal is transmitted via line 126 to a power combiner 128.

The output signal on line 56 transmitted from terminal $Y_2$ is received by an inverting photodiode 130 having a polarity which is opposite to that of the non-inverting photodiode 120. The inverted electronic output signal from photodiode 130 is transmitted via line 132 to an attenuator 134 wherein the magnitude of the output signal on line 132 is adjusted. From attentuator 134 the output signal is transmitted via line 136 to the power combiner 128.

Power combiner 128 functions to sum the signals received from lines 126 and 136 so as to provide an output signal representative of that sum to amplifier 138. The output signal is amplified by amplifier 138 and transmitted via output line 106 to conventional signal processors (not shown) or similar devices as may be needed in the particular application for which the filter is being used.

The attenuators 124 and 134 may be adjusted in order to set the ratio of the detected light intensities which are to be combined in the power combiner. By this means, an overall filtering function which is unrestricted by an absence of negativity is obtained.

All-pass filters, such as the one described above, are important in practice, since they can be used to equalize a given phase or group delay. FIG. 19 presents a plot of the theoretical frequency response of the complete cascaded filter system of FIGS. 15 and 16, as well as of the filter sections of that system as the time delay increases, with respect to normalized magnitude. Specifically, the magnitude response of the all-pole filter section 100 is illustrated at 130, while that of the all-zero filter section 102 is illustrated at 132. The magnitude response of the full, cascaded system is illustrated at 134.

Figure 20:
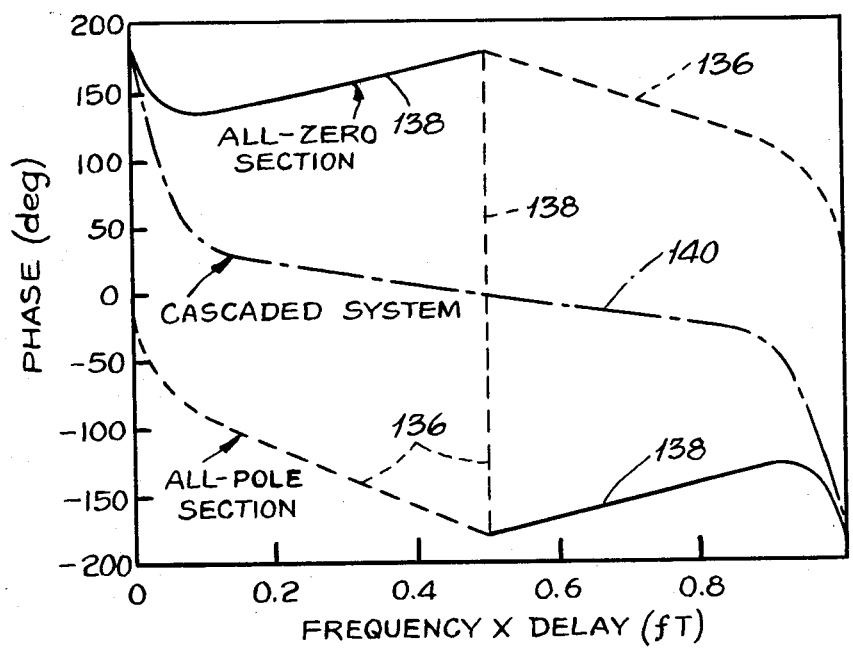
FIG. 20 is a plot of phase vs. frequency times delay for the cascaded filter of the present invention, along with plots of its recursive and non-recursive sections.

FIG. 20 provides a further illustration of the phase responses of the cascaded system and its filter sections. Specifically, the response of the all-pole filter section 100 is illustrated at 136, while the response of the all-zero filter section 102 is illustrated at 138. The response of the total, cascaded system is illustrated at 140.

The cascaded filter arrangement described herein provides a unique and yet straight forward means for utilizing the fiber-optic all-zero and all-pole filter sections in various combinations in order to provide versatile filtering capability either with or without negativity. The filter design may be directly extended to higher orders by merely adding more stages to the lattice. Such higher order filters provide more degrees of freedom for the design of more complex frequency responses. In addition, by incorporating in-line optical amplifiers into these fiber-optic lattice filters, compensation for propagation and coupling losses is provided, thereby permitting a very large number of stages, particularly in the IIR section.

Thus, the invention described herein provides a fiber optic lattice filter capable of use in many applications requiring complex filtering, since it defines a transfer function having zeros and poles which may be adjusted independently of each other. Further, the filter system provides for handling both positive and negative values in the filter, and thus overcomes the inability of prior fiber-optic filter devices to function in applications involving negative values and more complex pole-zero diagrams.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A fiber optic lattice filter comprising:
    an all-pole fiber optic filter;
    an all-zero fiber optic filter connected to the all-pole fiber optic filter, wherein one of said fiber optic filters receives an input signal and provides a first filtered signal, and the other of said fiber optic filters receives the first filtered signal and provides a filtered output signal.

2. A fiber optic lattice filter as defined in claim 1, wherein the poles of the all-pole fiber optic filter and the zeros of the all-zero fiber optic filter are adjusted independently.

3. A fiber optic lattice filter as defined in claim 1, further comprising a detection system for processing the filtered output signal such that substantially any selected frequency may pass through the fiber optic lattice filter.

4. A fiber optic lattice filter as defined in claim 3, wherein said other of the fiber optic filters provides output signals on two fiber optic output waveguides, the output signals comprising the filtered output signal, and wherein the detection system comprises:
    a first photosensor connected to one of the two fiber optic output waveguides for providing a signal corresponding to the signal on said one of the waveguides;
    a first attenuator for adjusting the signal from the first photosensor;
    a second photosensor connected to the other of the two fiber optic waveguides for providing a signal corresponding to the signal on said other of the waveguides;
    a second attenuator for adjusting the signal from the second photosensor; and
    a device for combining the adjusted signals from the first and second attenuators so as to provide an output signal within a range representative of substantially any selected signal frequency which is passed through the lattice filter.

5. A fiber optic lattice filter as defined in claim 1, wherein the all-pole and all-zero filters are tuned to provide desired characteristics of a transfer function.

6. A fiber optic filter, comprising:
    a plurality of optical couplers, each for coupling energy between waveguides passing therethrough;
    a first monomode fiber optic waveguide for guiding energy between the optical couplers;
    a second monomode, fiber optic waveguide passing through a pair of the optical couplers and coupled between an output port of a second of said pair of couplers and an input port of a first of said pair of couplers for guiding energy coupled by said second coupler into the second waveguide back into said first coupler for coupling back into the first waveguide; and
    a third monomode, fiber optic waveguide passing through a third of the plurality of optical couplers for guiding energy coupled by the third coupler into the third waveguide to an output terminal.

7. A fiber optic filter as defined in claim 6 wherein the couplers are spaced along the first waveguide by amounts selected to produce desired characteristics of a transfer function.

8. A fiber optic filter as defined in claim 6 wherein the couplers are comprised of:
    first and second optical fibers mounted adjacent one another to form an interaction region, each of said fibers lying in a plane; and
    means for displacing the planes to adjust the coupling efficiency of the coupler.

9. A fiber optic filter as defined in claim 6 wherein the length of the second waveguide between the pair of optical couplers is selected to produce a desired characteristic of a transfer function.

10. A fiber optic filter as defined in claim 6 wherein the third waveguide also passes through a fourth of the plurality of optical couplers such that at least a portion of light coupled from the first waveguide to the third waveguide through the third coupler is coupled back to the first waveguide from the third waveguide through the fourth coupler.

11. A fiber optic filter as defined in claim 10 wherein the length of the third waveguide between the third and fourth couplers is selected to produce a desired characteristic of a transfer function.

12. A fiber optic filter as defined in claim 6, further comprising a detection system for receiving light signals from at least the first waveguide and for processing the light signals such that substantially any selected frequency may pass through the fiber optic filter.

13. A fiber optic filter as defined in claim 12, wherein light signals are provided on the first and third waveguides to comprise a filtered output signal, and wherein the detection system comprises:
a first photosensor connected to one of the first and third fiber optic waveguides for providing a signal corresponding to the signal on said one of the waveguides;
a first attenuator for adjusting the signal from the first photosensor;
a second photosensor connected to the other of the first and third fiber optic waveguides for providing a signal corresponding to the signal on said other of the waveguides;
a second attenuator for adjusting the signal from the second photosensor; and
a device for combining the adjusted signals from the first and second attenuators so as to provide an output signal within a range representative of substantially any selected signal frequency which is passed through the fiber optic filter.

14. A fiber optic filter comprising:
a recursive fiber optic filter section;
a non-recursive fiber optic filter section connected to the recursive fiber optic filter section, wherein one of the filter sections receives an input signal and provides a first filtered signal, and the other of the filter sections receives the first filtered signal and provides a filtered output signal.

15. A fiber optic filter as defined in claim 14 wherein the recursive and non-recursive filter sections comprise a plurality of filter section components, and wherein selected components of one of said filter sections are adjusted independently from components of the other of said filter sections to provide increased filter response.

16. A fiber optic filter as defined in claim 14, further comprising a detection system for processing the filtered output signal such that substantially any selected frequency may pass through the fiber optic filter.

17. A fiber optic filter as defined in claim 16, wherein said other of the fiber optic filters provides output signals on two fiber optic output waveguides, the output signals comprising the filtered output signal, and wherein the detection system comprises:
a first photosensor connected to one of the two fiber optic output waveguides for providing a signal corresponding to the signal on said one of the waveguides;
a first attenuator for adjusting the signal from the first photosensor;
a second photosensor connected to the other of the two fiber optic waveguides for providing a signal corresponding to the signal on said other of the waveguides;
a second attenuator for adjusting the signal from the second photosensor; and
a device for combining the adjusted signals from the first and second attenuators so as to provide an output signal within a range representative of substantially any selected signal frequency which is passed through the lattice filter.

18. A fiber optic filter comprising:
a first fiber optic waveguide defining an optical path for light waves;
a second fiber optic waveguide defining another optical path for light waves;
first and second couplers for juxtaposing the first and second waveguides, respectively, at first and second coupling locations, respectively, on the first waveguide, said coupling locations oriented such that optical signals travelling within the first waveguide encounter the first coupling location prior to the second coupling location, said second coupler coupling light from the first waveguide to the second waveguide at the second coupling location, and said first coupler coupling light from the second waveguide to the first waveguide at the first coupling location to provide optical feedback from the second coupling location to the first coupling location;
a third fiber optic waveguide defining an optical path for light waves;
a fourth fiber optic waveguide defining another optical path for light waves;
a third coupler for juxtaposing the third and fourth fiber optic waveguides at a selected coupling location on said third and fourth waveguides to couple light between the third and fourth waveguides; and
wherein one of the first and third waveguides receives an input signal and provides a first filtered signal, and the other of the first and third waveguides receives the first filtered signal and provides a filtered output signal.

19. A fiber optic filter as defined in claim 18 wherein the first, second, third and fourth fiber optic waveguides are comprised of monomode fiber.

20. A fiber optic filter as defined in claim 18 further comprising a fourth coupler for juxtaposing the third and fourth waveguides at a second selected coupling location on said third and fourth waveguides to couple light from the fourth waveguide to the third waveguide.

21. A fiber optic filter as defined in claim 18, further comprising a detection system for processing the filtered output signal such that substantially any selected frequency may pass through the fiber optic filter.

22. A method of filtering in an array of fiber optic couplers for coupling power between optical waveguides, comprising the steps of:
positioning first and second waveguides in conjunction with first and second couplers so as to provide feedback recirculation of light between the first and second waveguides through the first and second couplers;
positioning third and fourth waveguides in conjunction with a third coupler so as to provide feed-forward coupling of light between the third and fourth waveguides through the third coupler;
introducing an input signal onto one of the first and third waveguides;
providing a first filtered signal from said one of the first and third waveguides in response to the input signal; and
introducing the first filtered signal onto the other of the first and third waveguides in response to the first filtered signal.

23. A method of filtering as defined in claim 22, further comprising adjusting the couplers to produce a desired characteristic of a transfer function.

24. A method of filtering as defined in claim 22, further comprising the step of positioning the third and fourth waveguides in conjunction with a fourth coupler so as to provide feed-forward coupling of light from the third waveguide to the fourth waveguide through the third coupler and from the fourth waveguide to the third waveguide through the fourth coupler.

25. A method of filtering as defined in claim 22, further comprising the steps of:
detecting the filtered output signal; and
processing the filtered output signal such that substantially any selected frequency may pass through the fiber optic filter.

26. A method of filtering as defined in claim 25, wherein the step of processing the filtered output signal comprises the steps of:
providing a first signal corresponding to the light signal on one of the third and fourth waveguides;
providing a second signal corresponding to an inversion of the light signal on the other of the third and fourth waveguides; and
summing the first and second signals to provide an output signal which is capable of representing both positive and negative valued input signals.

27. A method of filtering as defined in claim 26 wherein, prior to the step of summing, the method further comprises the step of adjusting the magnitude of the first and second signals, thereby adjusting the response of the fiber optic filter.

* * * * *

UNITED STATES PATENT AND TRADEMARK OFFICE
CERTIFICATE OF CORRECTION

PATENT NO. : 4,768,850
DATED : September 6, 1988
INVENTOR(S) : Behzad M. R. Moslehi, Herbert John Shaw, Moshe Tur, and Joseph W. Goodman.

Page 1 of 2

It is certified that error appears in the above-identified patent and that said Letters Patent is hereby corrected as shown below:

Column 4, line 40, please correct "least on other" to --least one other--.

Column 5, line 10, please correct "of and optical" to --of an optical--.

Column 6, line 41, please correct "$\pi$" to --$\rho$--.

Column 6, Equation 2, please correct "$\pi_1$" to --$\rho_1$--.

Column 6, line 58, please correct "$r_1$" to --$\rho_1$--.

Column 6, line 63, please correct "$r_1$" to --$\rho_1$--.

Column 6, line 64, please correct "$\pi_1$" to --$\rho_1$--.

Column 7, Equation 4, please correct "$\pi_1$" to --$\rho_1$--.

Column 7, line 9, please correct "$r_1$" to --$\rho_1$--.

Column 7, line 11, please correct "$r_1$" to --$\rho_1$--.

Column 11, line 24, please correct "$\pi_1$" to --$\rho_1$--.

Column 11, line 43, please correct "$\pi$" to --$\rho$--.

Column 11, line 47, please correct "$\pi$" to --$\rho$--.

Column 11, line 50, please correct "$\pi$" to --$\rho$--.

UNITED STATES PATENT AND TRADEMARK OFFICE
CERTIFICATE OF CORRECTION

PATENT NO. : 4,768,850

DATED : September 6, 1988

INVENTOR(S) : Behzad M. R. Moslehi, Herbert John Shaw, Moshe Tur, and Joseph W. Goodman.

Page 2 of 2

It is certified that error appears in the above-identified patent and that said Letters Patent is hereby corrected as shown below:

Column 11, line 53, please correct "$\pi$" to --$\rho$--.

Column 12, line 14, please correct "$\pi_2$" to --$\rho_2$--.

Column 13, line 24, please correct "slighly" to --slightly--.

Column 14, line 33, please correct "FIG. 9" to --FIG. 16--.

Column 15, line 65, please correct "he" to --the--.

Column 17, line 66, please correct "fhe" to --the--.

Please correct the inventorship to read "Behzad M.R. Moslehi, Herbert John Shaw, Moshe Tur, and Joseph W. Goodman", deceased.

Signed and Sealed this

Fourth Day of December, 1990

Attest:

HARRY F. MANBECK, JR.

Attesting Officer

Commissioner of Patents and Trademarks